US012672190B2

(12) United States Patent (10) Patent No.: US 12,672,190 B2
Zhao et al. (45) Date of Patent: Jun. 30, 2026

(54) MESSAGE PUSH METHOD AND APPARATUS

(71) Applicant: Honor Device Co., Ltd., Shenzhen (CN)

(72) Inventors: Zhao Zhao, Shenzhen (CN); Wenpeng Wang, Shenzhen (CN); Nengfu Tang, Shenzhen (CN); Yanzhao He, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 703 days.

(21) Appl. No.: 18/002,188

(22) PCT Filed: Apr. 22, 2022

(86) PCT No.: PCT/CN2022/088482

§ 371 (c)(1),
(2) Date: Dec. 16, 2022

(87) PCT Pub. No.: WO2023/005282

PCT Pub. Date: Feb. 2, 2023

(65) Prior Publication Data

US 2024/0237115 A1    Jul. 11, 2024

(30) Foreign Application Priority Data

Jul. 30, 2021    (CN) .......................... 202110874535.1

(51) Int. Cl.
*H04W 76/19* (2018.01)
*H04W 4/80* (2018.01)

(52) U.S. Cl.
CPC ............. *H04W 76/19* (2018.02); *H04W 4/80* (2018.02)

(58) Field of Classification Search
CPC ............................... H04W 76/19; H04W 4/80
See application file for complete search history.

(56) References Cited

U.S. PATENT DOCUMENTS 10,064,025 B2    8/2018  Lewis et al.
2014/0156319 A1   6/2014  Deeb
(Continued)

FOREIGN PATENT DOCUMENTS

CN        102613958 A    8/2012
CN        205281402 U    6/2016
(Continued)

*Primary Examiner* — David Bilodeau
(74) *Attorney, Agent, or Firm* — Slater Matsil, LLP

(57) ABSTRACT

This application discloses a message push method and an apparatus. The method includes: receiving, by a first terminal, a first notification message and pushing the first notification message to a second terminal, when the first terminal and the second terminal are having a communication connection successfully established; receiving, by the first terminal, a second notification message and storing the second notification message into a storage area, when the first terminal and the second terminal are communicatively disconnected; and pushing, by the first terminal to the second terminal, a notification message stored in a storage area, when the first terminal and the second terminal recover from being communicatively disconnected to having a communication connection successfully established.

20 Claims, 20 Drawing Sheets

(56)         References Cited

U.S. PATENT DOCUMENTS

| | | | | |
|---|---|---|---|---|
| 2014/0364089 A1* | 12/2014 | Lienhart | ................. | H04W 4/12 |
| | | | | 455/412.2 |
| 2015/0341903 A1* | 11/2015 | Jeong | ............... | H04M 1/72412 |
| | | | | 455/458 |
| 2015/0341904 A1* | 11/2015 | Ryu | ........................ | H04W 4/80 |
| | | | | 455/458 |
| 2015/0350362 A1* | 12/2015 | Pollack | ................. | H04L 67/566 |
| | | | | 709/217 |
| 2016/0065682 A1 | 3/2016 | Li | | |
| 2016/0337290 A1* | 11/2016 | Li | .......................... | H04L 67/55 |
| 2017/0069179 A1* | 3/2017 | Aoki | ....................... | H04L 67/55 |
| 2017/0094484 A1* | 3/2017 | Li | ........................ | H04W 64/00 |
| 2017/0339536 A1* | 11/2017 | Lewis | ................... | H04W 4/80 |
| 2019/0058739 A1* | 2/2019 | Lin | ..................... | H04L 65/1036 |
| 2020/0314797 A1* | 10/2020 | Mei | ....................... | H04W 12/06 |
| 2021/0185638 A1* | 6/2021 | Pathak | ............... | H04L 41/0686 |

FOREIGN PATENT DOCUMENTS

| | | | |
|---|---|---|---|
| CN | 106302808 A | 1/2017 |
| CN | 106657329 A | 5/2017 |
| CN | 106657570 A | 5/2017 |
| CN | 110166624 A | 8/2019 |
| CN | 112166411 A | 1/2021 |
| CN | 112422746 A | 2/2021 |
| CN | 113747374 A | 12/2021 |
| WO | 2017200592 A1 | 11/2017 |

* cited by examiner

Figure 2D:
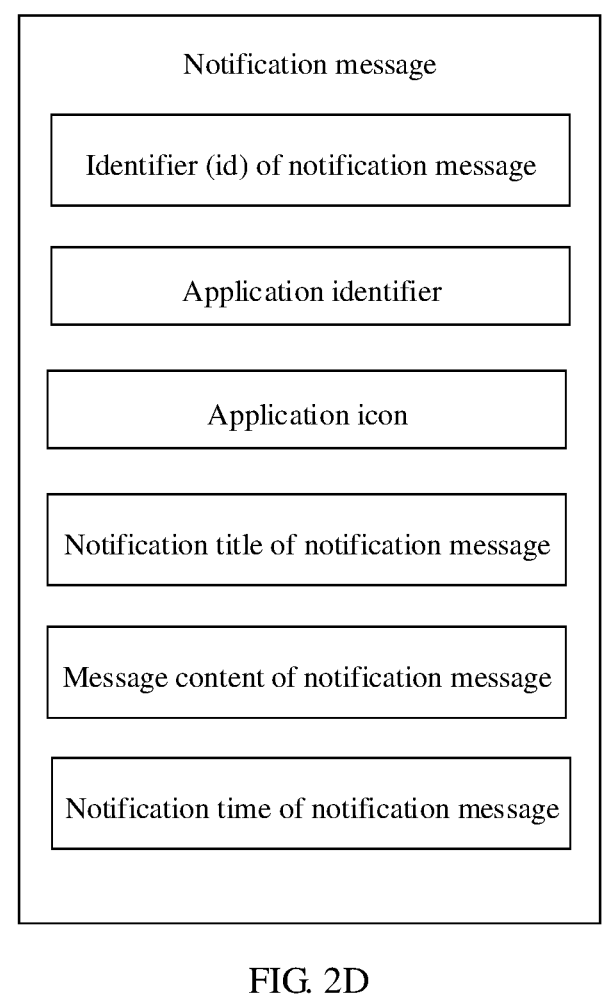

Notification message

Identifier (id) of notification message

Application identifier

Application icon

Notification title of notification message

Message content of notification message

Notification time of notification message

Create a storage area on a first terminal side when a
first trigger condition is satisfied

302

Store a target notification message of a target
application into the storage area

303

Push the target notification message in the storage
area to the first terminal or a second terminal when a
second trigger condition is satisfied

MESSAGE PUSH METHOD AND APPARATUS

CROSS-REFERENCE TO RELATED APPLICATIONS

This application is a national stage of International Application No. PCT/CN2022/088482, filed on Apr. 22, 2022, which claims priority to Chinese Patent Application No. 202110874535.1, filed on Jul. 30, 2021. The disclosures of both of the aforementioned application are hereby incorporated by reference in their entireties.

TECHNICAL FIELD

This application relates to the computer storage field, and in particular, to a message push method and an apparatus.

BACKGROUND

Bluetooth wristbands, as a kind of technological product that attracts attention of users, have powerful functions that are quietly infiltrating and changing people's lives. For example, after a Bluetooth wristband establishes a Bluetooth connection to a terminal, the Bluetooth wristband side can synchronously display a notification message of the terminal side, which brings great convenience to users.

However, due to a limited communication range of the Bluetooth connection, when the user wearing the Bluetooth wristband is away from the terminal for some distance, the Bluetooth connection between the terminal and the Bluetooth wristband may be disconnected and the Bluetooth wristband is unable to receive unread notification messages in the disconnected period. This features poor human-computer interaction performance, causing users to miss some important notification information.

SUMMARY

This application provides a message push method, so as to push notification messages to users in a timely manner, thereby improving human-computer interaction performance of terminals and effectively preventing users from missing important notification messages.

According to a first aspect, this application provides a message push method. The method includes: receiving, by a first terminal, a first notification message and pushing the first notification message to a second terminal, when the first terminal and the second terminal are having a communication connection successfully established; receiving, by the first terminal, a second notification message and storing the second notification message into a storage area, when the first terminal and the second terminal are communicatively disconnected; and pushing, by the first terminal to the second terminal, a notification message stored in a storage area, when the first terminal and the second terminal recover from being communicatively disconnected to having a communication connection successfully established.

In this embodiment of this application, the first terminal and the second terminal may be any electronic devices with a communication connection function, for example, an electronic device capable of Bluetooth communication, universal serial bus (Universal Serial Bus, USB) communication, Wi-Fi communication, or near-field communication (near field communication, NFC). For example, the first terminal includes an electronic device with a communication connection function, for example, a mobile terminal, a tablet computer, a desktop computer, a laptop computer, a handheld computer, a notebook computer, and an ultra-mobile personal computer (ultra-mobile personal computer, UMPC). For example, the second terminal includes an electronic device with a communication connection function, for example, a wearable Bluetooth device (for example, a Bluetooth wristband or a Bluetooth watch) or a Bluetooth in-vehicle device.

Generally, when the first terminal and the second terminal are communicatively disconnected, the first terminal cannot push a notification message to the second terminal. Even after the first terminal and the second terminal recover to having a communication connection, the first terminal either no longer pushes to the second terminal an unread notification message received during disconnection of the communication connection. As a result, a user can never receive the unread notification message in a first connection state. This features poor human-computer interaction performance, causing users to miss important notification messages.

However, according to the message push method provided in this embodiment of this application, if the first terminal and the second terminal are communicatively disconnected, the notification message of the first terminal is stored in the storage area. If the first terminal and the second terminal recover to having a communication connection, the notification message is pushed to the second terminal through the communication connection. In this way, notification messages are pushed to users in a timely manner, thereby improving human-computer interaction performance of the first terminal and the second terminal, and effectively preventing the user from missing important notification messages.

In a possible implementation, the first terminal and the second terminal having a communication connection successfully established specifically includes: the first terminal and the second terminal having a communication connection successfully established with a radio frequency resource for data interaction established between the first terminal and the second terminal; the first terminal and the second terminal being communicatively disconnected specifically includes: the first terminal and the second terminal having a communication connection successfully established with no radio frequency resource for data interaction established between the first terminal and the second terminal; and the first terminal and the second terminal recovering to having a communication connection specifically includes: the first terminal and the second terminal recover from having no radio frequency resource for data interaction established to having a radio frequency resource for data interaction established, with a communication connection successfully established between the first terminal and the second terminal.

For example, when the radio frequency resource for data interaction between the first terminal and the second terminal is disconnected for some causes (for example, being affected by an interference signal on the radio frequency resource or a radio frequency resource shielding instrument), no radio frequency resource for data interaction established between the first terminal and the second terminal is available, and the first terminal cannot send a notification message received by the first terminal to the second terminal. In this case, the storage area needs to be created to store notification messages received by the first terminal in a period in which the communication connection is established between the first terminal and the second terminal and the radio frequency resource is not established. When the first terminal and the second terminal recover to having a radio frequency resource established and the first terminal and the second terminal have a communication connection, the notification message stored in the storage area is pushed to the user in a timely manner. Therefore, this fills a code program loophole that the first terminal cannot push a notification message to the second terminal due to some external factors even if the first terminal and the second terminal are having a communication connection established. In addition, pushing the notification message stored in the storage area to the user in a timely manner improves human-computer interaction performance of the first terminal and the second terminal, and effectively prevents the user from missing important notification messages.

In a possible implementation, a radio frequency resource for data interaction being established between the first terminal and the second terminal specifically includes: a working mode of the second terminal being a first working mode, with a radio frequency resource for data interaction established between the first terminal and the second terminal, where the first working mode includes non-do-not-disturb mode or non-driving mode; and no radio frequency resource for data interaction being established between the first terminal and the second terminal specifically includes: a working mode of the second terminal being a second working mode, with no radio frequency resource for data interaction established between the first terminal and the second terminal, where the second working mode includes do-not-disturb mode or driving mode.

For example, the first terminal is a mobile terminal, and the second terminal is a wearable device. If a communication connection has been established between the mobile terminal and the wearable device (for example, the connection is established through Bluetooth) and the wearable device is in the do-not-disturb mode, no radio frequency resource for data interaction has been established between the mobile terminal and the wearable device, and the mobile terminal cannot send a notification message to the wearable device. In this case, the storage area is created on the mobile terminal side to execute the method provided in this embodiment of this application. For another example, the first terminal is a mobile terminal, and the second terminal is an in-vehicle device. When a communication connection has been established between the mobile terminal and the in-vehicle device (for example, the connection is established through Bluetooth or USB) and the in-vehicle device is in the driving mode, no radio frequency resource for data interaction has been established between the mobile terminal and the in-vehicle device, and the mobile terminal cannot send a notification message to the in-vehicle device. In this case, the storage area is created on the mobile terminal side to execute the method provided in this embodiment of this application.

It can be understood that if the second terminal is in the do-not-disturb mode or the driving mode, it indicates that currently the user does not want to be disturbed by an electronic product. Therefore, when the second terminal is in the do-not-disturb mode or the driving mode, a notification message received by the first terminal is stored in the storage area, to avoid disturbing the user at an inappropriate time. After the second terminal is switched to the non-do-not-disturb mode or the non-driving mode, the notification message stored in the storage area can be pushed to the user in a timely manner, thereby effectively preventing the user from missing important notification messages.

In a possible implementation, the receiving, by a first terminal, a first notification message and pushing the first notification message to a second terminal, when the first terminal and the second terminal are having a communication connection successfully established specifically includes: when the first terminal and the second terminal are having a communication connection successfully established with a radio frequency resource for data interaction established between the first terminal and the second terminal, and the first terminal runs a first configuration, receiving, by the first terminal, a second notification message generated by a first application, and sending the second notification message to the second terminal; where the first configuration is used to indicate that the first terminal is allowed to send a notification message of the first application to the second terminal; the receiving, by the first terminal, a second notification message and storing the second notification message into a storage area, when the first terminal and the second terminal are communicatively disconnected specifically includes: when the first terminal and the second terminal are having a communication connection successfully established with a radio frequency resource for data interaction established between the first terminal and the second terminal, and the first terminal runs a second configuration, receiving, by the first terminal, a second notification message generated by the first application, and storing the second notification message into the storage area; where the second configuration is used to indicate that the first terminal is not allowed to send a notification message of the first application to the second terminal; and the first terminal and the second terminal recovering to having a communication connection specifically includes: the first terminal recovering from running the second configuration to running the first configuration, with a communication connection successfully established between the first terminal and the second terminal, and a radio frequency resource for data interaction established between the first terminal and the second terminal.

For example, the first configuration and the second configuration may be default configurations. For example, by default, when the first terminal determines that the current time is daytime (for example, from 9:00 am to 8:00 pm), the first terminal runs the first configuration, so that the first terminal can push to the second terminal the notification message of the first application (the first application may include some unimportant application programs, for example, an application program such as a browser or Netease Cloud). When the first terminal determines that the current time is nighttime (for example, from 8:00 pm to 9:00 am), the first terminal runs the second configuration, so that the first terminal is not allowed to push the notification message of the first application to the second terminal.

For example, the first configuration and the second configuration may be user-defined configurations. For example, the first-terminal side provides the user with a function of setting whether the first terminal is allowed to push notification messages of which applications to the second terminal during nighttime or daytime. For example, if the user sets allowing the first terminal to push a notification message of the first application to the second terminal during nighttime or daytime, the first terminal runs the first configuration during nighttime or daytime. Alternatively, if the user sets allowing the first terminal to push a notification message of the first application to the second terminal during daytime and not allowing the first terminal to push a notification message of the first application to the second terminal during nighttime, the first terminal runs the first configuration during daytime and runs the second configuration during nighttime.

It can be understood that regardless of whether the first configuration and the second configuration are default configurations or user-defined configurations, they can be used repeatedly after being set once. This is different from the do-not-disturb mode or the like that can be merely set once and used once. For example, the user generally turns on the do-not-disturb mode of the second terminal during nighttime and turns off the do-not-disturb mode of the second terminal during daytime, so that the user needs to perform the action of turning on and off the do-not-disturb mode every day. However, in the foregoing manner in which the first terminal runs the first configuration by default during daytime and the second configuration by default during nighttime, the user merely needs to set once the function of allowing the first terminal to run the first configuration by default during daytime and run the second configuration by default during nighttime, and the function of the first configuration and the second configuration is repeatedly used for many times, with no need to repeatedly perform the turning on and off actions every day. This reduces performance loss caused by repeatedly receiving and responding to the turning on and off actions of the user by the first terminal, and also simplifies operation steps of the user, thereby bringing great convenience to the user.

In addition, in this embodiment of this application, when the first terminal runs the second configuration and the first terminal is not allowed to push the notification message of the first application to the second terminal, the notification message of the first application is stored into the storage area. When the first terminal runs the first configuration again and the first terminal is allowed to push the notification message of the first application to the second terminal, the notification message of the first application stored in the storage area is then pushed to the second terminal. In this way, notification messages are pushed to users in a timely manner, thereby improving human-computer interaction performance of the first terminal and the second terminal, and effectively preventing the user from missing important notification messages.

In a possible implementation, the running the first configuration by the first terminal specifically includes: if the first terminal determines that a working mode of the second terminal is a first working mode, running the first configuration by the first terminal, where the first working mode includes non-do-not-disturb mode or non-driving mode; and the running the second configuration by the first terminal specifically includes: if the first terminal determines that the working mode of the second terminal is a second working mode, running the second configuration by the first terminal, where the second working mode includes do-not-disturb mode or driving mode.

That is, the first configuration and the second configuration may be default configurations. For example, by default, when the first terminal determines that the second terminal is in the first working mode (the non-do-not-disturb mode or non-driving mode), the first terminal runs the first configuration, so that the first terminal can push to the second terminal the notification message of the first application (the first application may include some unimportant application programs, for example, an application program such as a browser or Netease Cloud). When the first terminal determines that the second terminal is in the second working mode (the do-not-disturb mode or driving mode), the first terminal runs the second configuration, so that the first terminal is not allowed to push the notification message of the first application to the second terminal.

For example, when the user takes a break and does not want to be disturbed by the electronic device nor wants to miss important notification messages, the do-not-disturb mode of the second terminal is then turned on. In the do-not-disturb mode, the first terminal is allowed to push a notification message of an important application, but the first terminal is not allowed to push a notification message of an unimportant application. In this case, an unimportant notification message is stored in the storage area, and after the second terminal turns off the do-not-disturb mode, the notification message in the storage area is then pushed to the second terminal. Therefore, whether to store the notification message into the storage area is associated with the do-not-disturb mode, and notification messages are pushed to users in a timely manner, so as to prevent the user from missing the notification message while responding to needs of the user at any time.

In a possible implementation, after the first terminal determines that the second terminal is in the second working mode, and receives an operation instruction from a user indicating that sending a notification message of the first application to the second terminal is allowed, running, by the first terminal, the first configuration; or after the first terminal determines that the second terminal is in the second working mode, and receives an operation instruction from a user indicating that sending a notification message of the first application to the second terminal is not allowed, running, by the first terminal, the second configuration.

That is, the first configuration and the second configuration may alternatively be user-defined configurations. For example, the user sets an application list whose notification messages cannot be sent by the first terminal to the second terminal if the first terminal is in the do-not-disturb mode or the driving mode. If the first application is included in the application list, the first terminal runs the second configuration. When the user removes the first application from the application list, the first terminal runs the first configuration, so as to further respond to needs of the user.

In a possible implementation, the storage area stores a sending time of a third notification message, the third notification message is any one of notification messages in the storage area, and the method further includes: if a time difference between the sending time of the third notification message and a current time is greater than first preset duration, deleting the third notification message from the storage area.

It can be understood that the sending time is a sending time at which an application generating the third notification message sends the third notification message to the first terminal. For example, the first preset duration is 5 minutes, that is, the first terminal stores, into the storage area, only notification messages received within five minutes (including five minutes) before the current time. Alternatively, if there is a third notification message whose sending time is greater than the current time plus the first preset duration in the notification messages stored in the storage area, the third notification message is deleted from the storage area.

In this embodiment of this application, the storage area is used to store notification messages received within the first preset duration before the current time, which can effectively save storage space, reduce a data volume of notification messages pushed to the second terminal through the communication connection, and alleviate data transmission pressure.

For ease of description, the first terminal and the second terminal being communicatively disconnected; or the first terminal and the second terminal having a communication connection successfully established with no radio frequency resource for data interaction established between the first terminal and the second terminal; or, the first terminal and the second terminal having a communication connection successfully established with a radio frequency resource for data interaction established between the first terminal and the second terminal, and the first terminal running the second configuration are collectively referred to as the first terminal and the second terminal being disconnected. The first terminal and the second terminal having a communication connection successfully established; or the first terminal and the second terminal having a communication connection established with a radio frequency resource for data interaction established between the first terminal and the second terminal; or, the first terminal and the second terminal having a communication connection successfully established with a radio frequency resource for data interaction established between the first terminal and the second terminal, and the first terminal running the first configuration are collectively referred to as the first terminal and the second terminal recovering to having a connection.

In a possible implementation, the second notification message carries an application identifier of an application that sends the second notification message, and the storing the second notification message into a storage area includes: if the application identifier is included in application identifiers of target applications, storing the second notification message into the storage area, where the target application includes an application program whose notification message is stored into the storage area by default, or the target application includes an application program whose notification message is allowed to be stored into the storage area as defined in a user setting.

For example, in a period in which the first terminal and the second terminal are disconnected, notification messages of all applications (the target application) on the first-terminal side may be stored in the storage area. Notification messages of some relatively important target applications (such as applications of phone, messaging, or WeChat) may be stored in the storage area, and notification messages of some less important target applications (such as applications of browser and Microblog) may not be stored into the storage area.

It can be understood that the target application may be an application whose notification message can be stored into the storage area by default, or may be set by the user. For example, by default, the target application is all application programs on the first-terminal side. Alternatively, by default, the target application is some important social application programs on the first-terminal side. Alternatively, the target application is an application whose notification message, as defined in user settings, can be stored into the storage area in a period in which the first terminal and the second terminal are disconnected.

In this embodiment of this application, notification messages of some relatively important target applications may be stored into the storage area, and notification messages of some less important target applications may not be stored into the storage area. Therefore, when the first terminal and the second terminal recover to having a connection, important notification messages are pushed to the user while unimportant notification messages may not be pushed. This implements the purpose of pushing notification messages to users in a timely manner and preventing users from missing important notification messages, effectively saves storage space, also reduces a data volume of notification messages pushed to the second terminal through the communication connection, and alleviates data transmission pressure.

In a possible implementation, the second notification message carries an application identifier of a second application that sends the second notification message, and the storage area includes a message count corresponding to the application identifier of the second application; and after the receiving, by the first terminal, a second notification message, the method further includes: incrementing a value of the message count by 1.

In a possible implementation, the second notification message carries an application identifier of a second application that sends the second notification message, and the pushing, by the first terminal to the second terminal, a notification message stored in a storage area specifically includes: calculating the number of notification messages corresponding to the application identifier of the second application in application identifiers of notification messages in the storage area, to obtain a message count of the second application; and pushing the message count of the second application and the notification message in the storage area to the second terminal.

In this embodiment of this application, the first terminal may also push to the second terminal information about the second application and the message count corresponding to the notification messages corresponding to the second application, so as to simply and clearly inform the user how many notification messages the second application has.

For example, the information about the second application and the message count corresponding to the notification messages corresponding to the second application may be obtained in the following two manners.

1. An association relationship between the second application and the message count of the notification messages corresponding to the second application is stored in the storage area. For example, during storing of the second notification message into the storage area, it is searched whether the association relationship between the second application and the message count of the notification messages corresponding to the second application has been stored in the storage area. If yes, the value of the message count of the second application is increased by 1. If not, an association relationship between the second application and the message count (whose initial value is 0) of the notification messages corresponding to the second application is created, and the message count of the second application is increased by 1.

It can be understood that the second application and the message count corresponding to the second application are stored in the storage area, so that an existing message count stored in the storage area can be directly obtained when the message count needs to be sent to the second terminal, not requiring an action of statistics collection. In this way, a program responding time is accelerated, and data in the storage area is pushed to the second terminal more quickly.

2. During pushing of the notification messages in the storage area to the second terminal, a notification count of the notification messages, corresponding to the second application, in the notification messages stored in the storage area is obtained through statistics collection.

It can be understood that the message count is obtained through statistics collection after the notification messages in the storage area are pushed to the second terminal. This can avoid frequent addition and subtraction operations on the message count. For example, when the time difference between the sending time of the second notification message and the current time exceeds the first preset duration, the second notification message is deleted from the storage area, with no need to decrease the message count of the second application by 1. In addition, if the message count is stored in the storage area, especially when there are many types of applications in the storage area, an association relationship between applications and message counts corresponding to the applications occupy a specific amount of storage space. Therefore, not storing the message count in the storage area can effectively save storage space.

In a possible implementation, the second notification message includes one or more types of the following data: an identifier of the second notification message, a notification title of the second notification message, message content of the second notification message, a sending time of the second notification message, the application identifier of the application sending the second notification message, and an application icon; and the storing the second notification message into a storage area specifically includes: storing at least one type of data of the second notification message into the storage area.

In this embodiment of this application, the second notification message stored in the storage area may include partial or all specific data of the second notification message.

It can be understood that the second terminal (such as a wristband) generally has a relatively small screen capable of displaying limited content. Generally, the first terminal sends all details of a notification message to the second terminal, but the second terminal cannot display all the details of the notification message. In addition, if a target notification message includes excessive detailed data and a message count of the target notification message is large, a relatively large storage space may be occupied. In this case, the target notification message includes partial specific data of the notification message instead of all the specific data, thereby reducing a data volume of the target notification message pushed to the second terminal through the communication connection, and alleviating data transmission pressure. This can also effectively save storage space and avoid problems such as resource waste.

It can be understood that if the target notification message includes all the specific data of the notification message, the user is able to view all the specific data of the notification message on the second-terminal side (for example, the in-vehicle device), rather than viewing the notification message on the first-terminal side after receiving the notification message, thereby bringing great convenience to the user.

In a possible implementation, before the pushing, to the second terminal, a notification message stored in a storage area, the method further includes: if it is determined that the third notification message in the storage area has been viewed, deleting the third notification message from the storage area, where the third notification message is any one notification message in the storage area.

For example, if it is determined that the third notification message stored in the storage area is tapped or pulled down to view on the first-terminal side, the third notification message is deleted from the storage area. That is, in the period in which the first terminal and the second terminal are disconnected, unread notification messages may be stored in the storage area, and notification messages that have been viewed may not be stored in the storage area. In this way, the unread notification message is pushed to the second terminal in a timely manner, and storage pressure of the storage area is also reduced to save storage space.

In a possible implementation, the storage area is included in a random access memory on the first-terminal side.

In this embodiment of this application, the notification messages received in the period in which the first terminal and the second terminal are disconnected may be stored in a random access memory (Random Access Memory, RAM).

It can be understood that the RAM partition can also be understood as a main memory, and as an internal memory that directly exchanges data with the CPU, has a fast read and write speed. Therefore, using the RAM to store notification messages can improve a speed of reading and writing notification messages, speed up program responding time, save space of the magnetic disk, reduce performance loss, and improve user experience.

In a possible implementation, the storage area is included in a magnetic disk on the first-terminal side.

In this embodiment of this application, the notification messages received in the period in which the first terminal and the second terminal are disconnected may alternatively be stored in a fixed location of the magnetic disk.

It can be understood that the RAM is volatile, and for the notification messages stored in the RAM storage area, when the first terminal is powered off (for example, being shut down), the notification messages in the storage area may be cleared consequently. Therefore, the notification messages may be stored in the magnetic disk, to avoid the problem of data loss of the notification messages resulting from power-off of the first terminal.

In a possible implementation, before the receiving, by the first terminal, a second notification message, the method further includes: creating the storage area on the first-terminal side; or after the receiving, by the first terminal, a second notification message and before the storing the second notification message into a storage area, the method further includes: creating the storage area on the first-terminal side.

Optionally, the storage area may be created immediately after the first terminal and the second terminal are disconnected. It can be also understood that creating the storage area for later use when the first terminal has a small quantity of task events (for example, when the first terminal has not received any notification messages and does not need to process the notification message) can reduce concurrent processing of multiple tasks and speed up a program responding time.

Optionally, the storage area may alternatively be created after the first terminal and the second terminal are disconnected and the first terminal has received a notification message to be stored in the storage area. This avoids the problem of wasting storage resources and increasing storage performance burden due to creation of the storage area when the first terminal has not received any notification messages in the period in which the first terminal and the second terminal are disconnected.

In a possible implementation, after the pushing, by the first terminal to the second terminal, a notification message stored in a storage area, the method further includes: deleting the notification message from the storage area; or destroying the storage area.

It can be understood that when the first terminal and the second terminal recover to having a connection, after the first terminal pushes the notification message in the storage area to the second terminal, the notification message is deleted from the storage area or the storage area is destroyed, to reclaim the storage space of the storage area, thereby avoiding the problem of resource waste caused by leaving the storage area unused.

In a possible implementation, after the pushing, by the first terminal to the second terminal, a notification message stored in a storage area, the method further includes: skipping deleting the notification message from the storage area; or if it is determined that the time difference between the sending time and the current time is greater than a second preset time period and the second notification message has not been viewed, displaying the second notification message in the storage area again on the first terminal, or pushing the second notification message in the storage area to the second terminal again, or displaying the second notification message in the storage area on the first terminal again and pushing the second notification message in the storage area to the second terminal again.

It can be understood that data in the storage area may not be deleted after the first terminal pushes the notification message in the storage area to the second terminal. The notification message is pushed to the first terminal or the second terminal again after the data in the storage area has not been viewed for a specific period of time. For example, if the notification message in the storage area on the first-terminal side has not been viewed for more than 24 hours, the notification message in the storage area is pushed to the first terminal and/or the second terminal again. The data in the storage area is not deleted until the notification message is tapped or pulled down to view on the first-terminal side or the second-terminal side. In this way, the user is prompted of unread notification messages in a timely manner, preventing the user from missing important notification messages.

In a possible implementation, a communication connection being successfully established between the first terminal and the second terminal specifically includes: a Bluetooth connection has been successfully established between the first terminal and the second terminal; or a communication connection has been established between the first terminal and the second terminal through a universal serial bus USB; or a communication connection has been established between the first terminal and the second terminal through a wireless communication technology Wi-Fi; or a communication connection has been established between the first terminal and the second terminal through near field communication NFC.

According to a second aspect, this application provides a message push apparatus, including:

a transceiver unit, configured to receive, for a first terminal, a first notification message and push the first notification message to a second terminal, when the first terminal and the second terminal are having a communication connection successfully established;

a storage unit, configured to receive, for the first terminal, a second notification message and store the second notification message into a storage area, when the first terminal and the second terminal are communicatively disconnected; and a sending unit, configured to push, for the first terminal to the second terminal, a notification message stored in a storage area, when the first terminal and the second terminal recover from being communicatively disconnected to having a communication connection successfully established.

According to a third aspect, an embodiment of this application provides an electronic device, the electronic device includes one or more processors and a memory, where the memory is coupled to the one or more processors, the memory is configured to store computer program code, the computer program code includes a computer instruction, and the one or more processors invoke the computer instruction to cause the electronic device to perform the method in the first aspect or any possible implementation of the first aspect.

According to a fourth aspect, an embodiment of this application provides a chip system, where the chip system is applied to an electronic device, and the chip system includes one or more processors. The processor is configured to invoke a computer instruction to cause the electronic device to perform the method in the first aspect or any possible implementation of the first aspect.

According to a fifth aspect, an embodiment of this application provides a computer program product including an instruction, where when the computer program product is run on an electronic device, the electronic device is caused to perform the method in the first aspect or any possible implementation of the first aspect.

According to a sixth aspect, an embodiment of this application provides a computer-readable storage medium including an instruction, where when the instruction is run on an electric device, the electronic device is caused to perform the method in the first aspect or any possible implementation of the first aspect.

BRIEF DESCRIPTION OF THE DRAWINGS

FIG. 2D is a schematic diagram of all specific data included in a notification message according to an embodiment of this application;

DETAILED DESCRIPTION OF ILLUSTRATIVE EMBODIMENTS

Figure 1A:
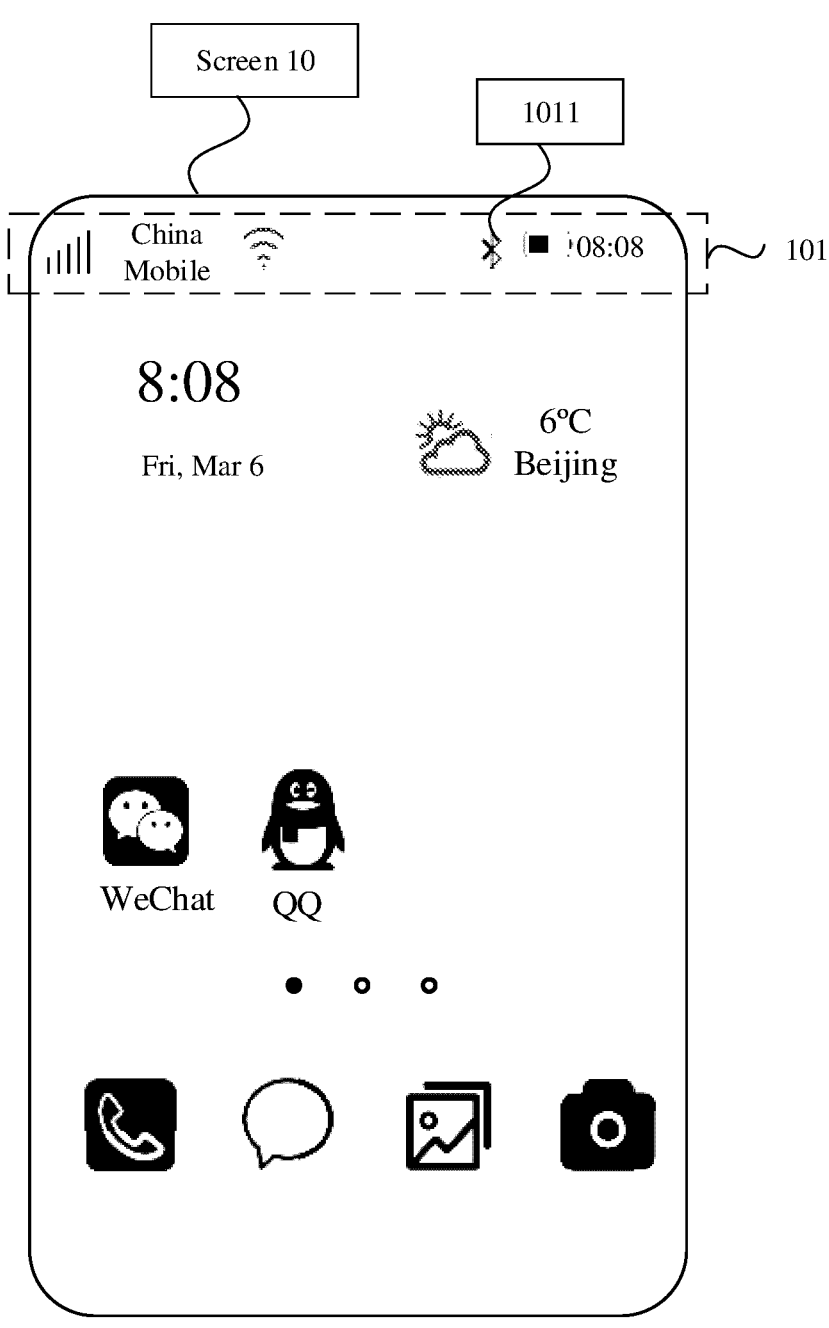
FIG. 1A is a schematic diagram of a user screen of a first terminal according to an embodiment of this application.

To make the objectives, technical solutions, and advantages of this application clearer, the following further describes this application with reference to the accompanying drawings.

In the specification, claims, and accompanying drawings of this application, the terms "first", "second", and so on are intended to distinguish between different objects but do not indicate a particular order. In addition, the terms "including", "including", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The term "embodiment" described herein means that specific features, structures, or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may be combined with other embodiments.

In this application, "at least one (item)" means one or more, "a plurality" means two or more, "at least two (items)" means two, three, or more than three. "And/or" describes an association relationship between associated objects, and indicates that three relationships may exist. For example, "A and/or B" may indicate the following three cases: A alone, B alone, and both A and B, where A and B may be singular or plural. The character "/" generally indicates an "or" relationship between the associated objects. "At least one (piece) of the following" or similar expressions means any combination of these items. For example, at least one (piece) of a, b, or c may mean: a, b, c, "a and b", "a and c", "b and c", or "a, b, and c".

In some implementations of message push, when a Bluetooth connection has been established between a first terminal and a second terminal, the first terminal may synchronously push a notification message to the second terminal through the Bluetooth connection.

However, if the Bluetooth connection between the first terminal and the second terminal has been disconnected or if the second terminal has turned on a do-not-disturb mode to cause disconnection of a message connection between the first terminal and the second terminal, the first terminal cannot push to the second terminal a notification message received during Bluetooth disconnection or in the do-not-disturb mode. After the Bluetooth connection between the first terminal and the second terminal has been re-established or the second terminal has turned off the do-not-disturb mode to re-establish the message connection between the first terminal and the second terminal, the first terminal may no longer send to the second terminal a notification message received during Bluetooth disconnection or in the do-not-disturb mode. As a result, human-computer interaction performance of the first terminal and the second terminal is poor, and the user cannot receive the notification message in a timely manner and misses important notification messages.

However, according to the method in the embodiments of this application, after the Bluetooth connection between the first terminal and the second terminal has been disconnected, or the second terminal has turned on the do-not-disturb mode, unread notification messages of the first terminal may be stored into the storage area. After the Bluetooth connection between the first terminal and the second terminal has been re-established or the second terminal has turned off the do-not-disturb mode, data in the storage area may be then pushed to the second terminal. In this way, unread notification messages received during Bluetooth disconnection period or in the do-not-disturb mode are informed to the user in a timely manner, thereby improving human-computer interaction performance of the first terminal and the second terminal and effectively preventing users from missing notification messages.

The following describes a user screen provided by the embodiments of this application.

In the embodiments of this application, the first terminal and the second terminal may be any electronic devices with a Bluetooth function. For example, the first terminal includes an electronic device with a Bluetooth function, for example, a mobile terminal, a tablet computer, a desktop computer, a laptop computer, a handheld computer, a notebook computer, and an ultra-mobile personal computer (ultra-mobile personal computer, UMPC). For example, the second terminal includes a wearable Bluetooth device (for example, a Bluetooth wristband or a Bluetooth watch), a Bluetooth in-vehicle device, and the like. It can be understood that, for ease of description, this document may provide description by using an example that the first terminal is a mobile terminal and the second terminal is a Bluetooth wristband.

First, a user screen used in the message push method is described. Refer to FIG. 1A to FIG. 1G.

As shown in FIG. 1A, a screen 10 is displayed on a home screen of the first terminal. As shown in FIG. 1A, the home screen 10 includes a status bar 101. The status bar 101 may include a name of the operator (for example, China Mobile), a time, a Wi-Fi icon, a signal strength, and a current remaining power level. The status bar 101 may further include a Bluetooth-on icon 1011, when the first terminal turns on a Bluetooth function, the Bluetooth-on icon 1011 is displayed in the status bar 101. It can be understood that, in addition to the Bluetooth-on icon 1011 for indicating that the first terminal has turned on Bluetooth, other indication manners may also be used to indicate that Bluetooth has been turned on, which is not limited in the embodiments of this application.

Figure 1B:
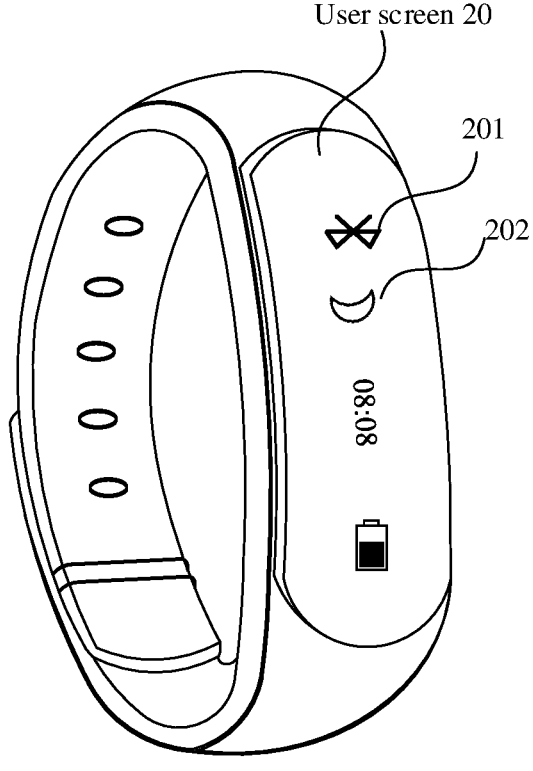
FIG. 1B is a schematic diagram of a user screen of a second terminal according to an embodiment of this application.

As shown in FIG. 1B, a screen 20 is displayed on a home screen of the second terminal. As shown in FIG. 1B, the home screen 20 may be used to display a current time and a current remaining power level. The home screen 20 may further include a Bluetooth-on icon 201. It can be understood that when the second terminal has turned on a Bluetooth function, the home screen 20 may display the Bluetooth-on icon 201. In some other scenarios, the home screen 20 may further include a do-not-disturb mode on icon 202. When the second terminal has turned on a do-not-disturb mode, the home screen 20 may display the do-not-disturb mode on icon 202.

Figure 1C:
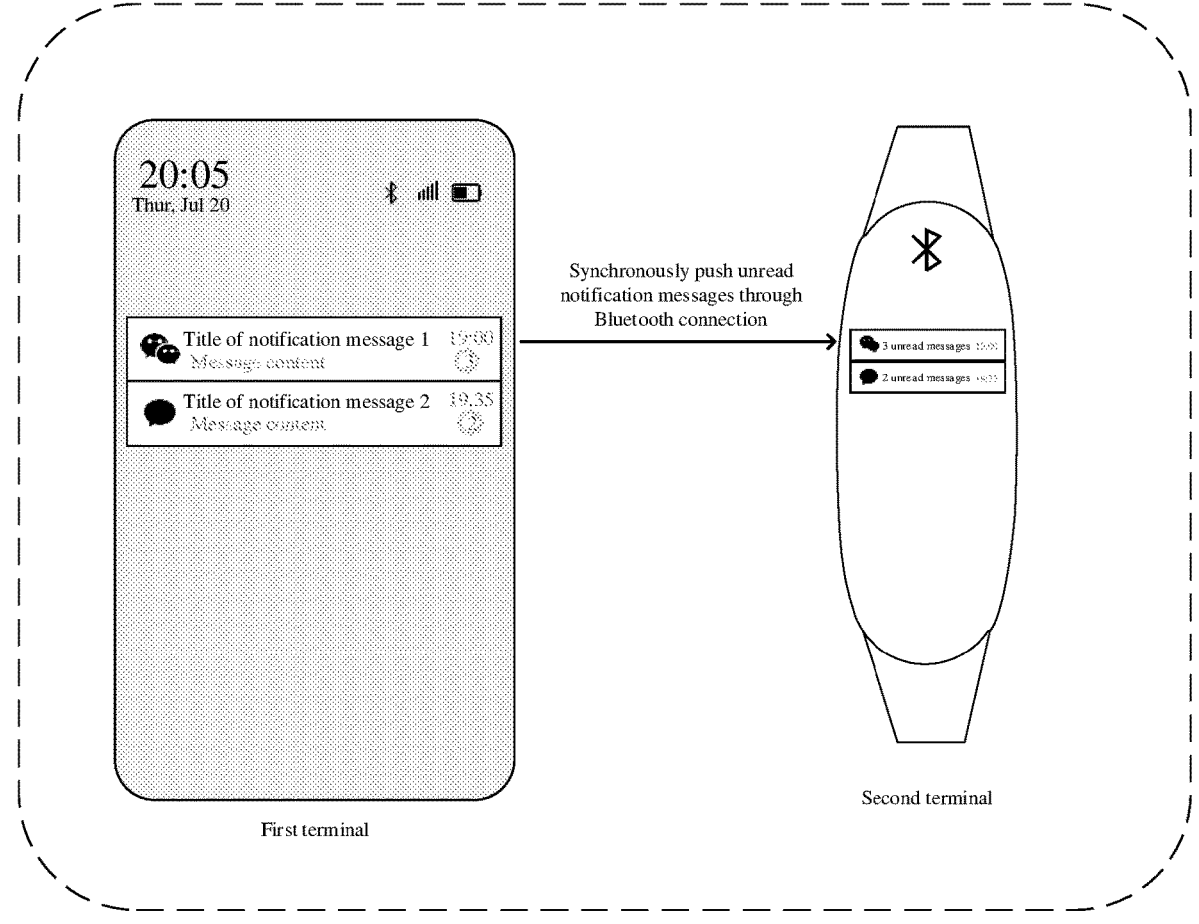
FIG. 1C is a schematic diagram of message interconnection between a first terminal and a second terminal according to an embodiment of this application.

For example, as shown in FIG. 1C, when the first terminal and the second terminal are having a communication connection established via Bluetooth, and the second terminal is in a non-do-not-disturb mode, the first terminal may synchronously push an unread notification message to the second terminal through the Bluetooth connection. For example, if there are three WeChat notification messages and two messaging notification messages on the first-terminal side, the three WeChat notification messages and two messaging notification messages on the first-terminal side may be synchronously pushed to the second terminal through the Bluetooth connection.

Generally, due to a limited Bluetooth communication distance, when a distance between the first terminal and the second terminal exceeds the Bluetooth communication range, the Bluetooth connection between the first terminal and the second terminal may be disconnected; or if a user turns off a Bluetooth function of the first terminal or the second terminal, the Bluetooth connection between the first terminal and the second terminal may be disconnected; or if the second terminal turns on the do-not-disturb mode, a message connection between the first terminal and the second terminal may be disconnected.

Figure 1D:
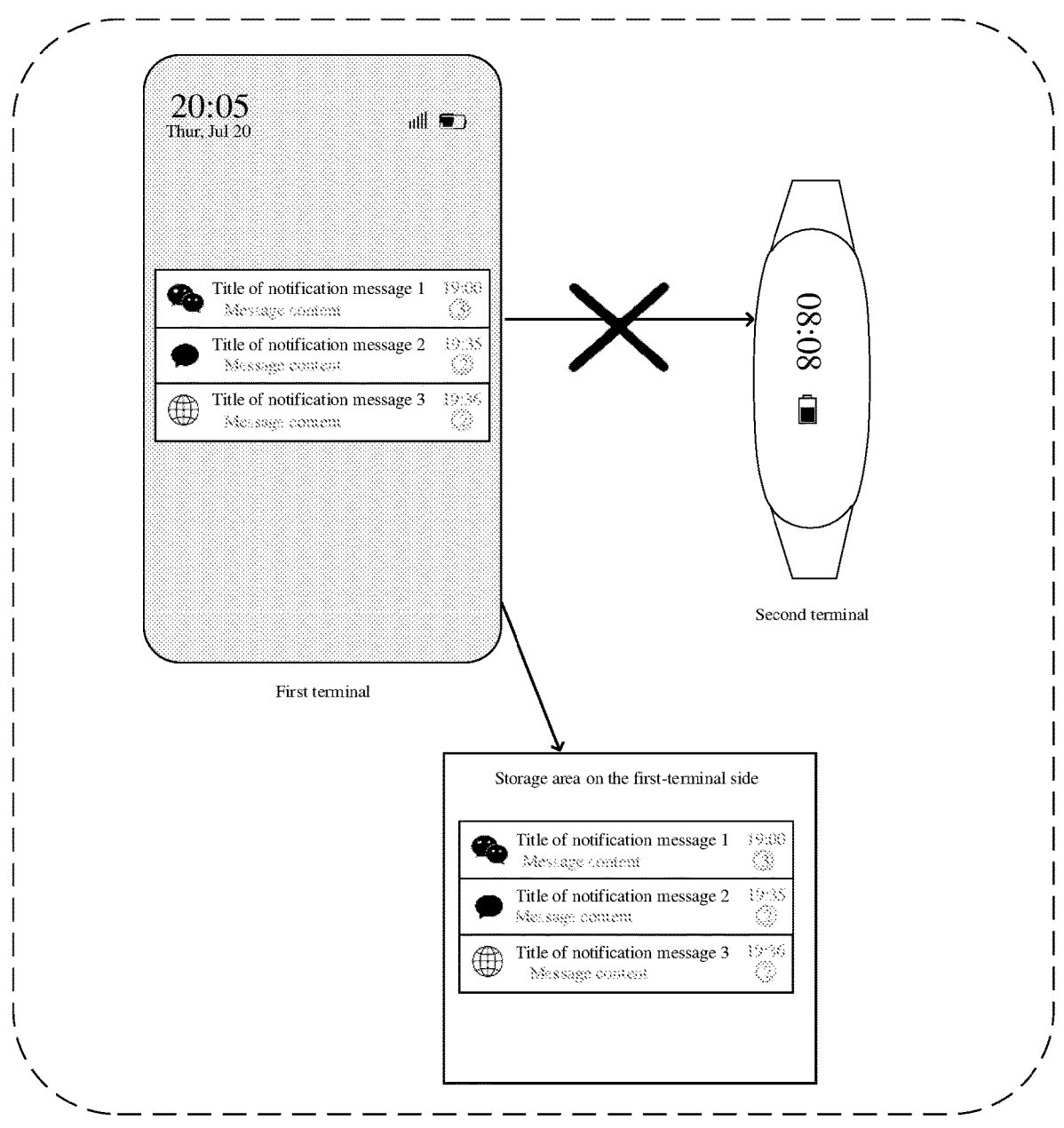
FIG. 1D is a schematic diagram of data stored in a storage area in a period in which a first terminal and a second terminal are commutatively disconnected according to an embodiment of this application.
Figure 1E:
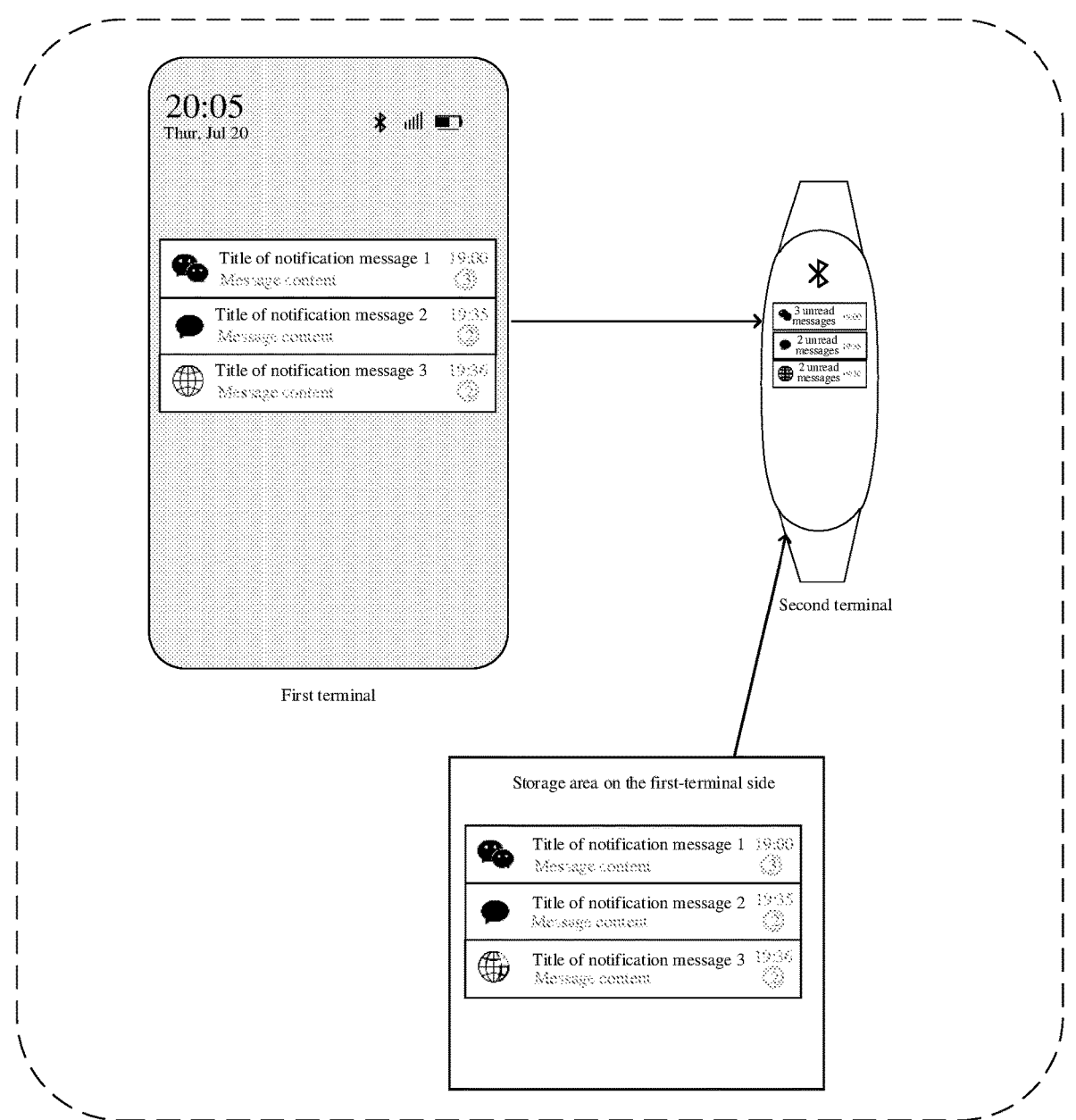
FIG. 1E is a schematic diagram of sending data in a storage area by a first terminal to a second terminal after the first terminal and the second terminal are having a communication connection re-established according to an embodiment of this application.

In the embodiments of this application, as shown in FIG. 1D, if the Bluetooth connection between the first terminal and the second terminal is disconnected or the second terminal turns on the do-not-disturb mode, a storage area is created on the first-terminal side and unread notification messages received during Bluetooth disconnection or in the do-not-disturb mode are stored into the storage area. Therefore, as shown in FIG. 1E, if the Bluetooth connection between the first terminal and the second terminal is re-established, or the second terminal has turned off the do-not-disturb mode and a Bluetooth communication connection has been established between the second terminal and the second terminal, notification messages received during Bluetooth disconnection or in the do-not-disturb mode may be then pushed to the second terminal, thereby improving human-computer interaction performance of the first terminal and the second terminal, pushing the notification message to the user in a timely manner, and effectively preventing the user from missing important messages.

Figure 1F:
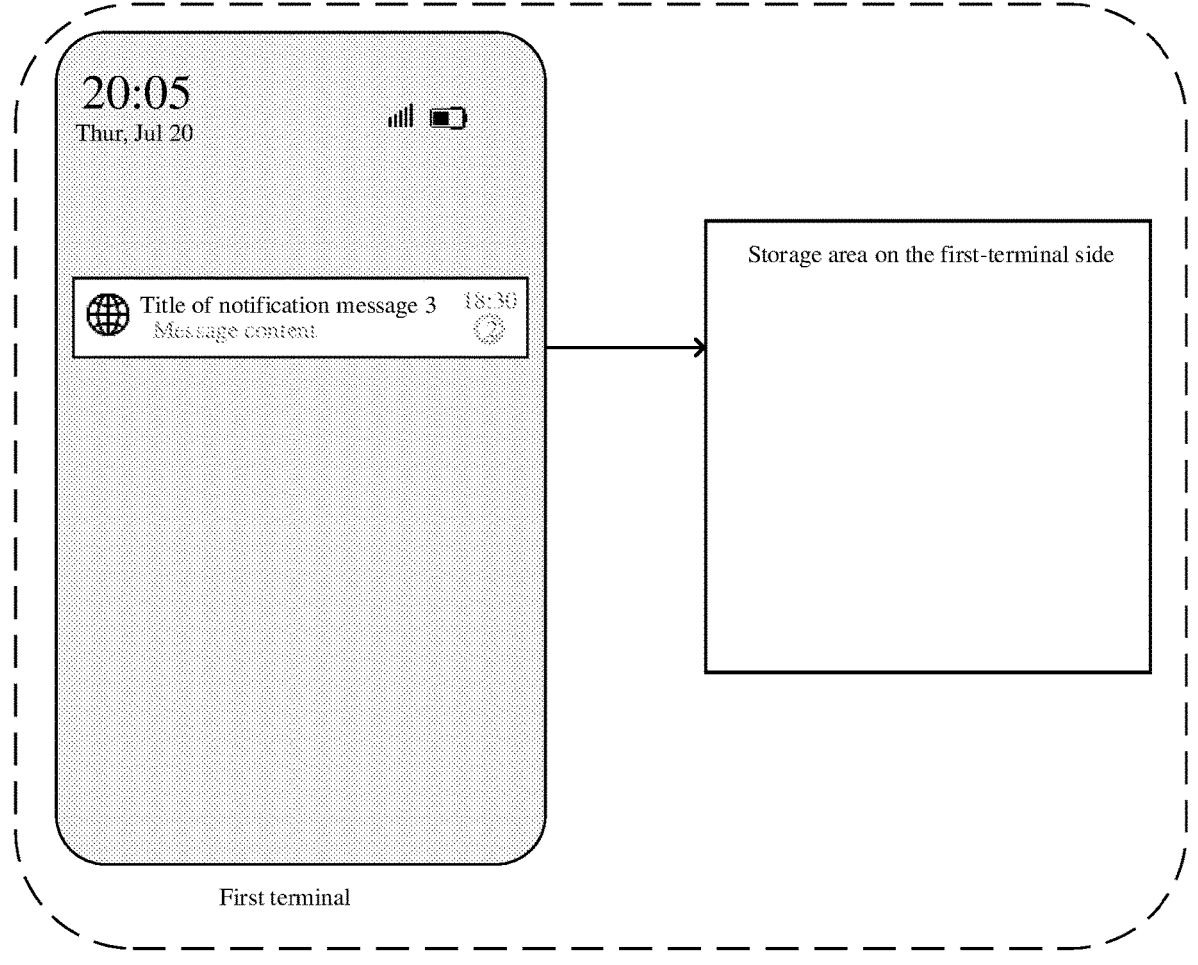
FIG. 1F and FIG. 1G are schematic diagrams of storing a notification message of a target application into a storage area according to an embodiment of this application.
Figure 1G:
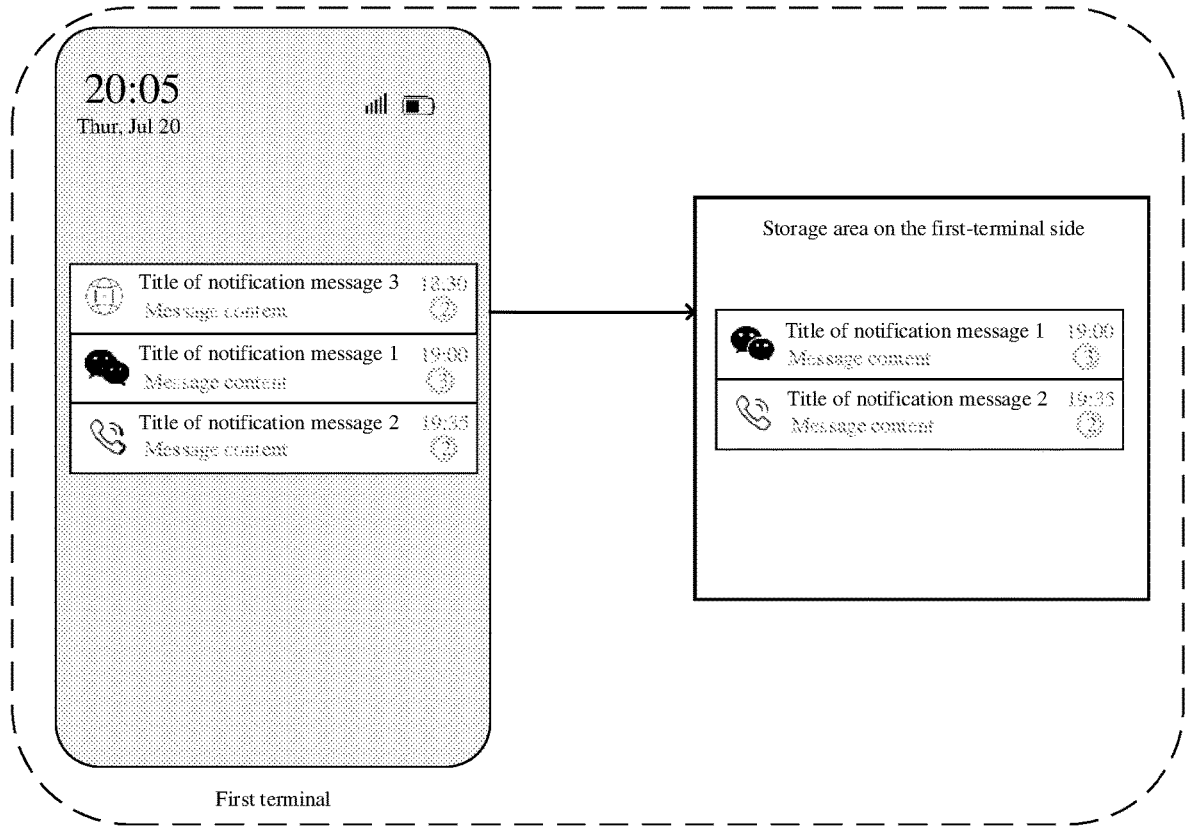

In some other embodiments, a target notification message stored in the storage area in the embodiments of this application is notification messages of some relatively important target applications. For example, the target application includes phone, messaging, and WeChat application programs. As shown in FIG. 1F, when the first-terminal side receives two notification messages from a browser application program, the notification messages are not added to the storage area at that time and data content in the storage area is empty. As shown in FIG. 1G, when the first-terminal side receives three notification messages from the WeChat application program and two notification messages from the phone application program, and the WeChat and phone application programs belong to the target application, the three WeChat notification messages and the two notification messages are stored in the storage area. This effectively saves storage space and avoids problems such as resource wastes. In addition, a data amount of target notification messages pushed to the second terminal through the communication connection can be reduced, thereby alleviating data transmission pressure.

In some other embodiments, the target notification messages stored in the storage area in the embodiments of this application are all unread notification messages. The unread notification message refers to a notification message that the user has not pulled down to view or tapped to view.

Figure 1H:
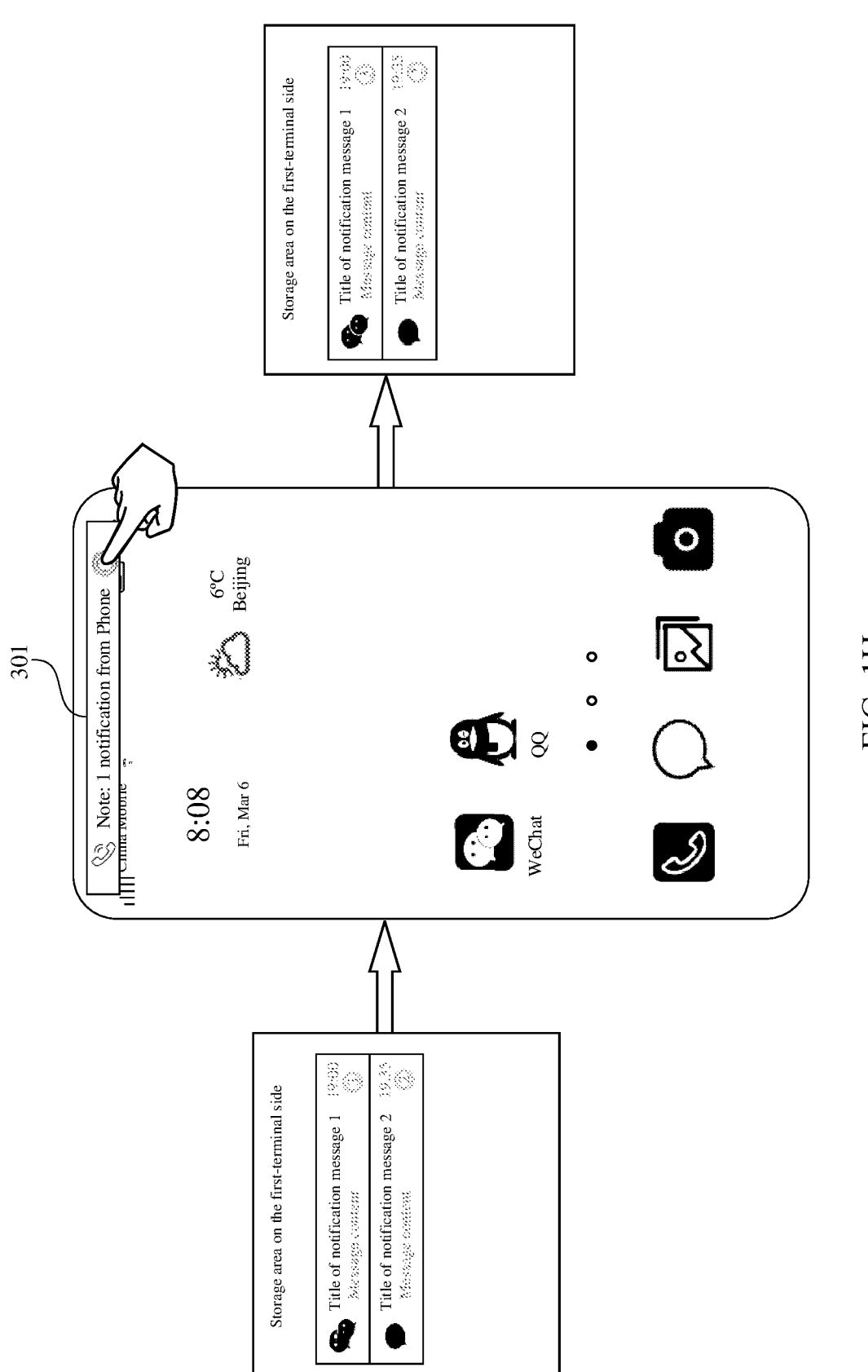
FIG. 1H to FIG. 1J are schematic diagrams of a change status of data content in a storage area after a notification message is pulled down to view or tapped to view according to an embodiment of this application.

For example, as shown in FIG. 1H, the first terminal receives one notification message 301 of WeChat, and if the user taps the notification message 301, it indicates that the notification message is an already-read notification message. In this case, the notification message is not stored in the storage area, and data in the storage area does not change. Alternatively, if the notification message has been stored in the storage area, the notification message is deleted from the storage area.

Figure 1I:
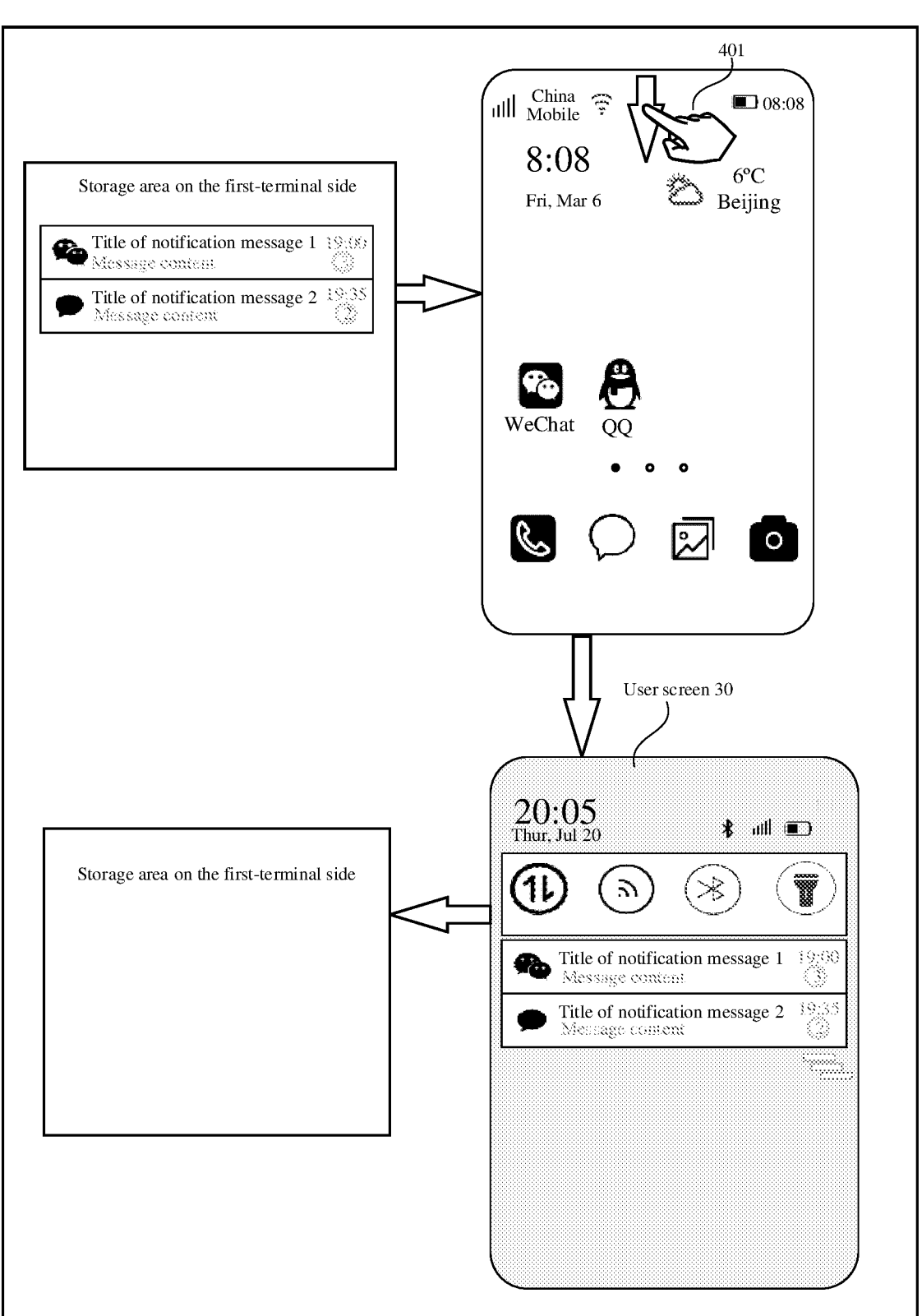

For example, in some embodiments, as shown in FIG. 1I, the first-terminal side detects an action 401 of pulling down a notification bar, and then displays a user screen 30. In this case, it is determined that all unread notification messages are updated to being read, and then all notification messages stored in the storage area are deleted; or the storage area is directly destroyed.

Figure 1J:
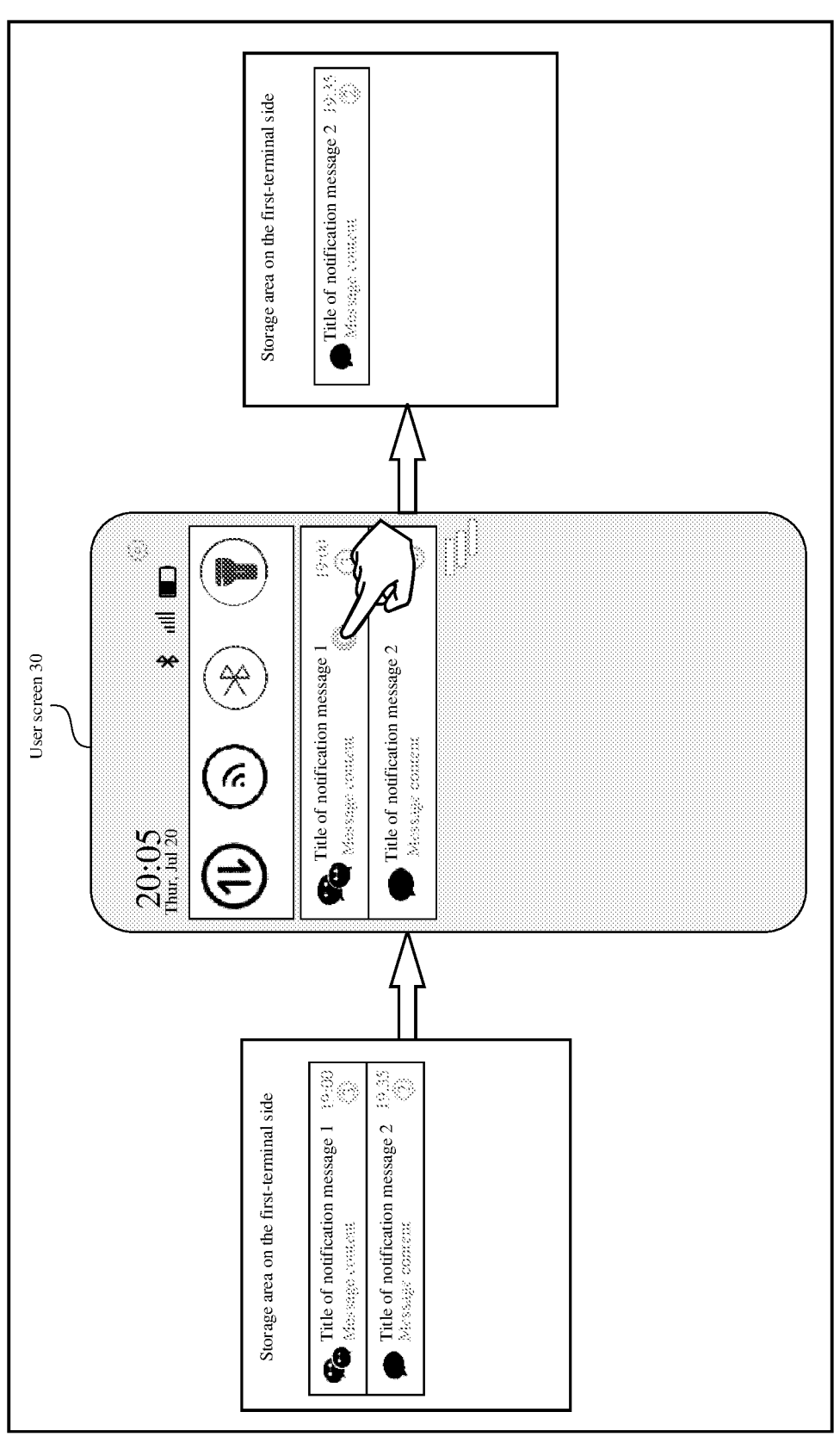

In some other embodiments, the first terminal does not delete data from the storage area immediately after detecting the pull-down action. Instead, after the user taps a notification message of a first application in a drop-down bar, the notification message of the first application in the storage area is then deleted. For example, as shown in FIG. 1J, after the user pulls down the notification bar and taps the WeChat notification message in the pulled-down notification bar, the WeChat notification message in the storage area is then deleted.

It can be understood that the method provided in the embodiments of this application is applicable to scenarios other than the foregoing scenario where the first terminal (a mobile terminal) is disconnected from the second terminal (a Bluetooth wristband). Usage scenarios of the message push method are not limited in the embodiments of this application. For example, it is also applicable to a scenario where the mobile terminal is connected to an in-vehicle device and the in-vehicle device is in a driving mode. Generally, when the user is driving a vehicle, for safety of the user, the driving mode is triggered after the vehicle reaches a specific speed. In the driving mode, the in-vehicle device does not receive or silently receives a notification message from the mobile terminal, so as not to disturb driving of the user. However, although the manner of not receiving or silently receiving notification messages can avoid disturbing the user, it is difficult for the user to find or notice the notification message after the in-vehicle device changes from the driving mode to a non-driving mode. Consequently, the user cannot receive and view the notification message in a timely manner. Therefore, the method in the embodiments of this application can also be used to create a storage area on the first-terminal side for storing notification messages if the in-vehicle device is in the driving mode; and after the in-vehicle device changes from the driving mode to the non-driving mode, the mobile terminal then pushes the notification message in the storage area to the in-vehicle device.

Figure 2A:
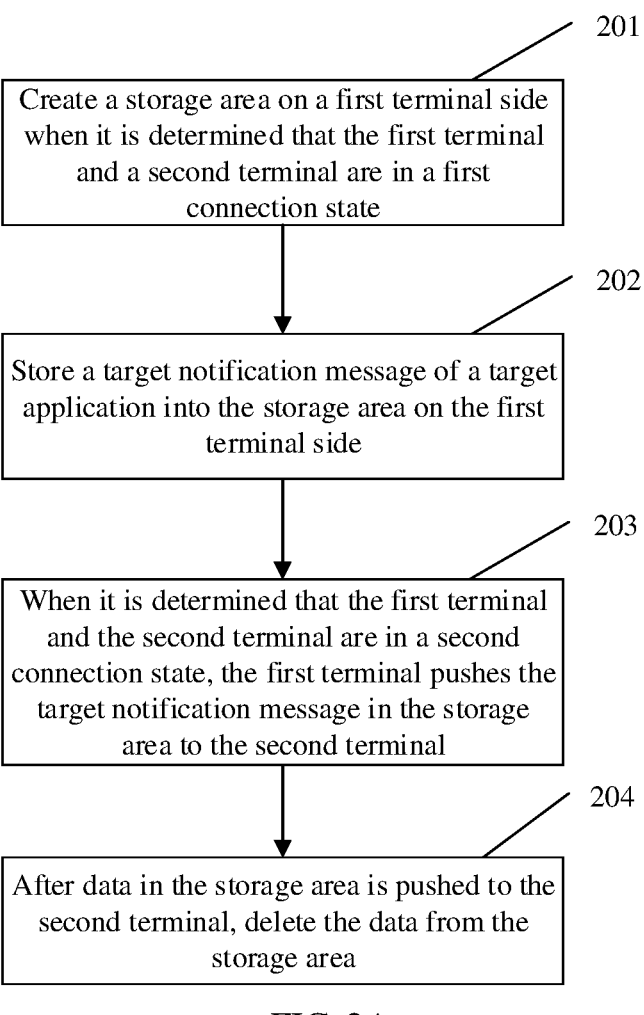
FIG. 2A is a schematic flowchart of a message push method according to an embodiment of this application.

Referring to FIG. 2A, FIG. 2A illustrates a message push method according to an embodiment of this application. As shown in FIG. 2A, the message push method includes the following steps.

201: Create a storage area on a first-terminal side when it is determined that the first terminal and a second terminal are in a first connection state.

In this embodiment of this application, the first terminal and the second terminal may be any electronic devices having a communication connection function (for example, a Bluetooth communication connection, a Wi-Fi communication connection, a USB communication connection, or an NFC communication connection technology). For example, the first terminal includes an electronic device with a communication connection function, for example, a mobile terminal, a tablet computer, a desktop computer, a laptop computer, a handheld computer, a notebook computer, and an ultra-mobile personal computer (ultra-mobile personal computer, UMPC). For example, the second terminal includes a wearable Bluetooth device (for example, a Bluetooth wristband or a Bluetooth watch), a Bluetooth in-vehicle device, and the like. It can be understood that, for ease of description, the first terminal being a mobile terminal, the second terminal being a Bluetooth wristband, and a communication connection having been established between the first terminal and the second terminal through Bluetooth is as an example for detailed description in this specification.

In this embodiment of this application, the communication connection may be established between the first terminal and the second terminal via Bluetooth. If the Bluetooth connection has been established between the first terminal and the second terminal, and the first terminal and the second terminal can send and receive communication messages to each other, unread notification messages of all applications of the first terminal may be pushed to the second terminal synchronously.

For example, the first terminal may establish a Bluetooth connection to the second terminal through Bluetooth pairing, or may establish a Bluetooth connection to the second terminal by downloading a dedicated application program, or may establish a Bluetooth connection to the second terminal by scanning a device QR code of the second terminal. It can be understood that a Bluetooth connection between the first terminal and the second terminal may be established in other manners, which is not limited in this embodiment of this application.

In this embodiment of this application, if the first terminal and the second terminal are in the first connection state, unread notification messages of part or all of the applications of the first terminal cannot be pushed to the second terminal. Therefore, the storage area needs to be created for storing the unread notification messages of the first terminal in the first connection state, so as to push the unread notification messages in the storage area to the second terminal after the first terminal and the second terminal recover to a normal communication connection state.

For example, the first connection state may be the following cases:

1. The first connection state includes that the Bluetooth connection between the first terminal and the second terminal has been disconnected. It can be understood that if the Bluetooth connection between the first terminal and the second terminal has ever been established but the Bluetooth connection between the first terminal and the second terminal is disconnected, the storage area is created on the first-terminal side, and the storage area is used for storing unread notification messages received by the first terminal in a period in which the Bluetooth connection between the first terminal and the second terminal is disconnected.

For example, if Bluetooth functions of the first terminal and the second terminal are both turned on, an instantiated object of a Bluetooth connection may be created on the first-terminal side, and then a Bluetooth connection request may be sent to the second terminal. After receiving the Bluetooth connection request, the second terminal sends to the first-terminal side a response of agreeing to accept the Bluetooth connection request or rejecting the Bluetooth connection request. If the first-terminal side receives a response that is of agreeing a Bluetooth establishment request and that is sent by the second terminal, the first terminal establishes a Bluetooth connection to the second terminal. For example, after turning on the Bluetooth function, the first terminal invokes a createconnection( )method to create an instantiated object of the Bluetooth connection. If a Bluetooth device (the second terminal) is detected within a Bluetooth connectable range, a Bluetooth connection request (for example, LMP_host_connection_req PDU) is sent to the second terminal by invoking the connection-request( )method. After receiving the Bluetooth connection request, the second terminal sends to the first terminal a message of agreeing the Bluetooth connection request (for example, LMP accepted PDU) or rejecting the Bluetooth connection request (for example, LMP_not_accepted PDU). After receiving the message of agreeing the Bluetooth connection sent by the first terminal, the second terminal determines to establish the Bluetooth connection to the first terminal by invoking the setupcomplete( )method.

It can be understood that the first-terminal side may monitor a connection status with the second terminal in a manner of registering with a monitoring mechanism. For example, if it is detected that the Bluetooth connection is in a connected state (for example, BluetoothDevice.AC-TION_ACL_CONNECTED), it is determined that a connection between the first terminal and the second terminal has been established via Bluetooth. If it is detected that the Bluetooth connection is in a non-connected state (for example, BluetoothDevice.ACTION_ACL_DISCON-NECTED), it is determined that the Bluetooth connection between the first terminal and the second terminal has been disconnected, and a storage area is then created on the second-terminal side.

It can be understood that an instantiated object of the Bluetooth connection may alternatively be created by the second terminal, and a Bluetooth connection request is sent to the second terminal, which is not limited in this embodiment of this application.

2. The first connection state includes that a communication connection between the first terminal and the second terminal has been established via Bluetooth, and the second terminal disables part of radio frequency resources used for the message connection to the first terminal for some causes, in other words, the message connection between the first terminal and the second terminal is disconnected.

For example, the second terminal includes a function of the do-not-disturb mode. When the second terminal and the first terminal are in a Bluetooth connected state, after the second terminal turns on the function of the do-not-disturb mode, the second terminal sends a preset message connection disconnect command to the first terminal (for example, the preset message connection disconnect command is an AT+CFUN=0 command), so as to disconnect the message connection between the first terminal and the second terminal.

It can be understood that if the message connection between the second terminal and the first terminal is disconnected, the first terminal cannot push an unread notification message to the second terminal, and the storage area needs to be created on the first-terminal side for storing unread notification messages received in the period in which the message connection between the first terminal and the second terminal is disconnected.

3. The first connection state includes that a connection between the first terminal and the second terminal has been established via Bluetooth, the message connection between the first terminal and the second terminal is not disconnected (which may alternatively be understood that the second terminal has not disabled a radio frequency resource of the message connection to the second terminal), and the first terminal is not allowed to push a notification message of a first application to the second terminal.

Figure 2B:
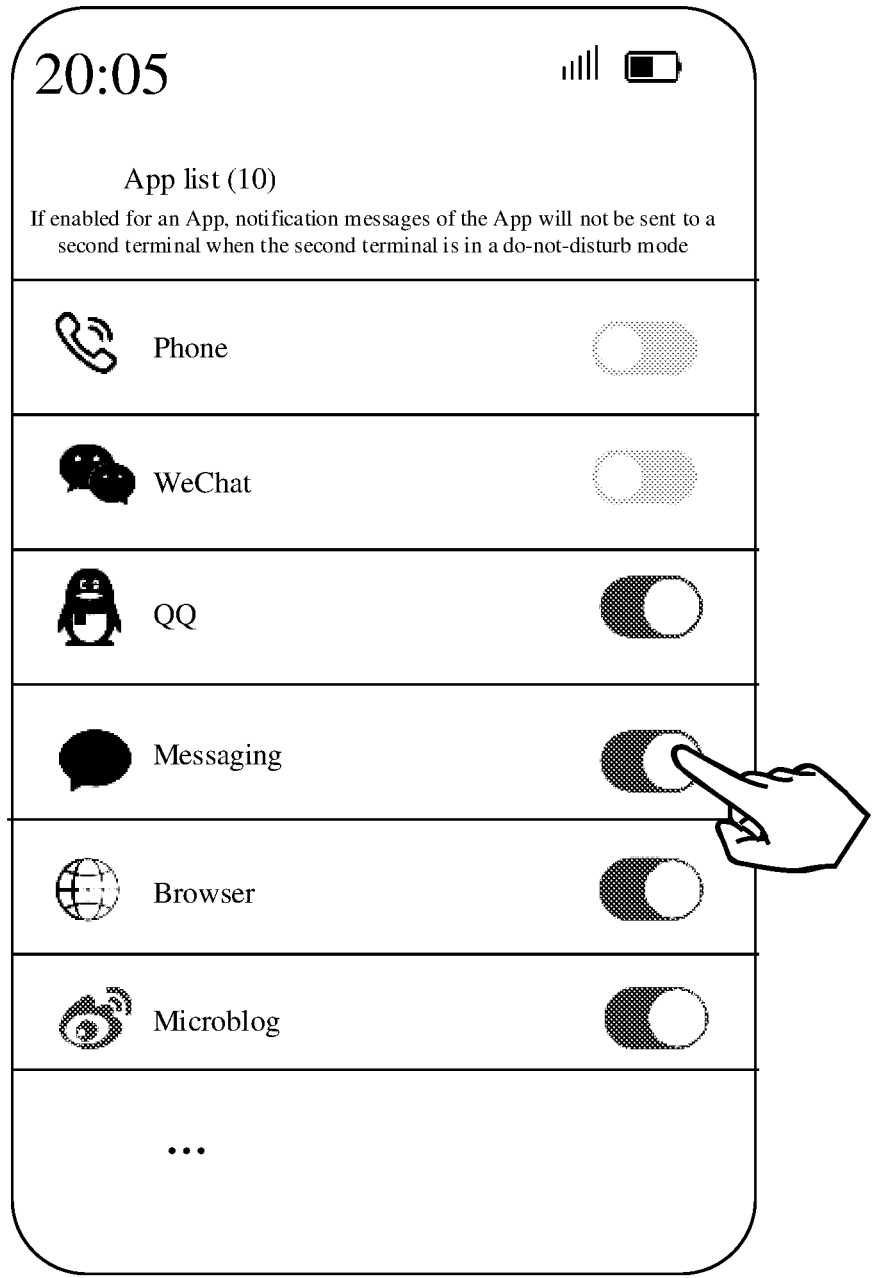
FIG. 2B and FIG. 2C are schematic diagrams of screens for setting a target application according to an embodiment of this application.

For example, if the second terminal turns on the do-not-disturb mode, the message connection between the first terminal and the second terminal is not disconnected; and by default, when the second terminal turns on the do-not-disturb mode, the notification message of the first application of the first terminal is not pushed to the second terminal. For example, by default, when the second terminal turns on the do-not-disturb mode, the first terminal does not push notification messages of applications such as browser and Microblog (which may also be understood as some less important applications) to the second terminal. For example, as shown in FIG. 2B, by default, when the second terminal turns on the do-not-disturb mode, notification messages of application programs such as QQ, WeChat, messaging, browser, and Microblog of the first terminal are not pushed to the second terminal.

For example, if the second terminal turns on the do-not-disturb mode, the message connection between the first terminal and the second terminal is not disconnected. However, the user sets not allowing the first terminal to push the notification message of the first application to the second terminal if the second terminal is in the do-not-disturb mode. Then, when the second terminal is in the do-not-disturb mode, the first terminal needs to create the storage area for storing an unread notification message of the first application in the do-not-disturb mode. For example, as shown in FIG. 2B, the user may set not allowing notification messages of which applications of the first terminal to be pushed to the second terminal when the second terminal has turned on the do-not-disturb mode.

It can be understood that the first-terminal side may provide the user with a function of setting allowing notification messages of which applications to be pushed to the second terminal in the do-not-disturb mode (which may be alternatively understood as a function of not allowing notification messages of which applications to be pushed to the second terminal in the do-not-disturb mode). For example, an application program specially used by the user to set allowing notification messages of which applications in the first terminal to be pushed to the second terminal when the second terminal is in the do-not-disturb mode is developed, and the user may download the application program on the first-terminal side, so that the first-terminal side uses the application program to set allowing notification messages of which applications to be pushed to the second terminal in the do-not-disturb mode.

It can be understood that the foregoing description of the first connection state is only an example, and the first connection state may alternatively be other cases. For example, a connection between the first terminal and the second terminal has been established via Bluetooth, the second terminal is in the do-not-disturb mode, and the second terminal is allowed to silently receive a notification message pushed by the first terminal. However, although a manner of silently receiving a notification message can avoid disturbing the user, after the second terminal changes from the do-not-disturb mode to the non-do-not-disturb mode, it is still difficult for the user to find or notice a notification message received in the do-not-disturb mode. For example, the user does not view or manually operate the second terminal, but switches the second terminal from the do-not-disturb mode to the non-do-not-disturb mode through voice recognition, and therefore is unaware of presence of the notification message. Therefore, in the method in this embodiment of this application, if the second terminal is in the do-not-disturb mode, the storage area for storing a notification message received during the period of the do-not-disturb mode is created on the first-terminal side or the second-terminal side. When the second terminal changes from the do-not-disturb mode to the non-do-not-disturb mode, the notification message in the storage area is then pushed to the second terminal. This embodiment of this application does not limit a specific scenario or form of the first connection state.

In this embodiment of this application, the creating a storage area includes: requesting a dynamic partition with a target capacity size from a random access memory (Random Access Memory, RAM) in a memory of the first terminal (this dynamic partition may also be understood as a storage area). For example, a dynamic partition with a capacity of 64M is requested from the RAM in the memory of the first terminal.

For example, the RAM of the first terminal may use a dynamic partition allocation method such as a first fit algorithm (First Fit), a best fit algorithm (Best Fit), or a worst fit algorithm (Worst Fit) to respond to the request for the dynamic partition with the target capacity size, so as to allocate an appropriate idle partition of the RAM as the storage area.

It can be understood that the capacity size of the dynamic partition may alternatively be other capacity sizes. For example, the capacity size of the dynamic partition may be greater than 64M or less than 64M, which is not limited in this embodiment of this application.

It can be understood that the RAM partition can also be understood as a main memory, and as an internal memory that directly exchanges data with the CPU, has a fast read and write speed. Therefore, using the dynamic partition (the storage area) of the RAM to store notification messages can improve a speed of reading and writing notification messages, speed up program responding time, save space of the magnetic disk, reduce performance loss, and improve user experience.

202: Store a target notification message of a target application into the storage area on the first-terminal side.

For example, the target application may be the following applications.

1. If the first connection state is that the Bluetooth connection between the first terminal and the second terminal has been disconnected, or the first connection state is that the connection between the first terminal and the second terminal has been established through Bluetooth and the second terminal disables part of radio frequency resources used for the message connection to the second terminal for some causes (which may be alternatively understood as the message connection between the first terminal and the second terminal being disconnected), the target application includes part or all of the application programs on the first-terminal side. Specifically, the application programs included in the target application may be the following cases:

(1) By default, the target application includes all application programs on the first-terminal side. For example, if the first-terminal side includes 10 application programs, the target application includes the 10 application programs.

(2) By default, the target application includes relatively important social application programs on the first terminal. For example, the target application includes phone, messaging, and WeChat application programs. It can be understood that the target application may alternatively include more or fewer important social application programs other than the phone, messaging, and WeChat application programs, which is not limited in this embodiment of this application.

(3) The target application includes application programs that are defined in user settings.

Figure 2C:
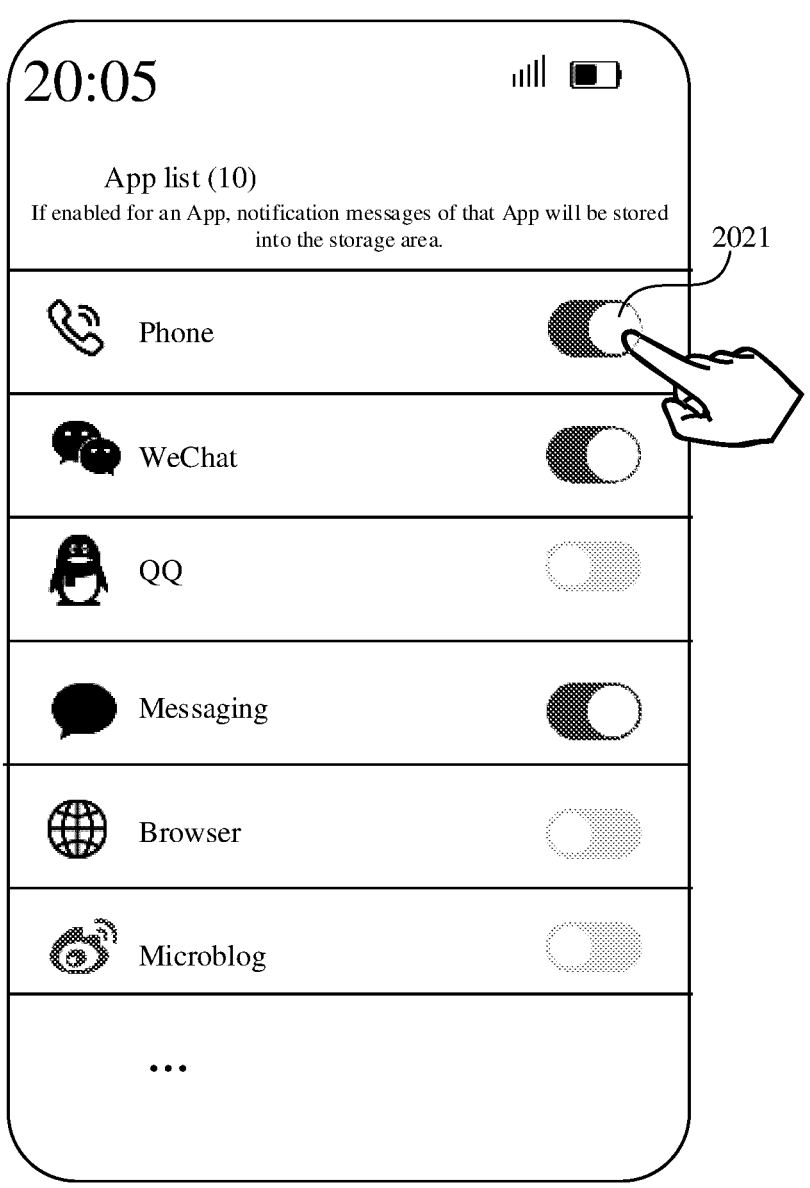

For example, a first setting function may be provided to the user on the first-terminal side, and the user may use the first setting function to set not allowing notification messages of which applications to be stored in the storage area in the period in which the Bluetooth connection between the first terminal and the second terminal is disconnected or the message connection between the first terminal and the second terminal is disconnected. For example, the first setting function provides the user with a user screen shown in FIG. 2C, and the user may operate a function switch 2021 to set application programs to be included in the target application. For example, the user sets allowing unread notification messages of the phone, messaging, and WeChat application programs to be stored in the storage area in the period in which the Bluetooth connection between the first terminal and the second terminal is disconnected or the message connection between the first terminal and the second terminal is disconnected. In this case, the target application includes the phone, messaging, and WeChat application programs.

It can be understood that the first setting function is provided to the user, so as to meet diverse needs of users and improve human-computer interaction performance.

2. If the first connection state is that the connection between the first terminal and the second terminal has been established via Bluetooth, the message connection between the first terminal and the second terminal is not disconnected, and the first terminal is not allowed to push the notification message of the first application to the second terminal, the target application includes the first application.

For example, the second terminal includes a do-not-disturb mode. Referring to FIG. 2B again, by default, if the second terminal is in the do-not-disturb mode, the first terminal is not allowed to push notification messages of QQ, WeChat, messaging, browser, and Microblog application programs of the first terminal to the second terminal. In this case, the target application includes the QQ, WeChat, messaging, browser, and Microblog application programs.

For example, the second terminal includes a do-not-disturb mode. Referring to FIG. 2B again, if the user sets not allowing the first terminal to push unread notification messages of QQ, WeChat, messaging, browser, and Microblog application programs of the first terminal to the second terminal when the second terminal is in the do-not-disturb mode. In this case, the target application includes the QQ, WeChat, messaging, browser, and Microblog application programs.

It can be understood that the application programs included in the target application are only examples, and the target application may further include fewer or more application programs than the foregoing application programs, which is not limited in this embodiment of this application.

In this embodiment of this application, before the storing a target notification message of a target application into the storage area on the first-terminal side, the method further includes: receiving, by the first terminal, notification messages of the target application.

In this embodiment of this application, the target notification message may include partial or all specific data of the notification messages of the target application.

Figure 2E:
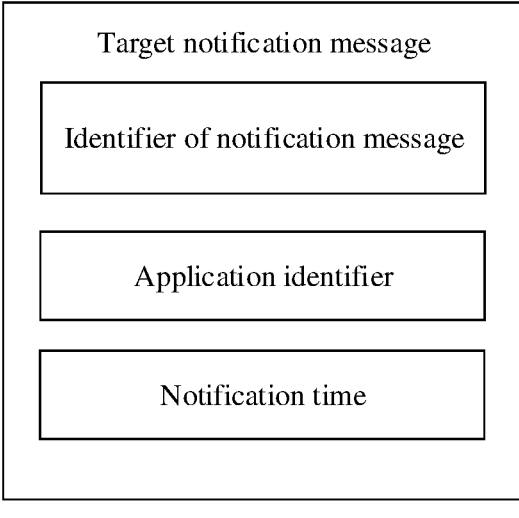
FIG. 2E and FIG. 2F are schematic diagrams of a target notification message including partial or all specific data of a notification message according to an embodiment of this application.

For example, as shown in FIG. 2D, all the specific data of the notification message of the target application includes:

an identifier (id) of the notification message, an application identifier of an application sending the second notification message (which may be also understood as an application name), an application icon of the application sending the notification message, a notification title of the notification message, message content of the notification message, and a notification time of the notification message (the notification time of the notification message can also be understood a sending time of the notification message described in other embodiments of this application). Data content included in the target notification message stored in the storage area may be in the following forms:

1. As shown in FIG. 2E, the target notification message includes: an identifier of the target notification message, an application identifier of the target application sending the target notification message, and a notification time of the target notification message.

2. The target notification message includes: one or both of an application identifier of the target application sending the target notification message or an application icon of the target application, and one or more of an identifier of the target notification message, a notification title of the target notification message, message content of the target notification message, and a notification time of the target notification message.

Figure 2F:
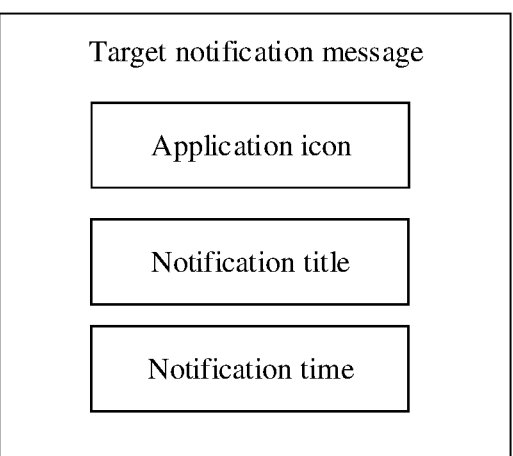

For example, as shown in FIG. 2F, the target notification message of the target application includes: the application icon of the target application, the notification title of the target notification message, and the notification time of the target notification message.

For example, the target application includes WeChat, the first-terminal side includes two unread notification messages of WeChat, namely a first notification message and a second notification message, and the second notification message is a latest notification message, which can also be understood as a notification time of the second notification message being closer to a current time than a notification time of the first notification message. In this case, the target notification message may include: a WeChat icon, the notification time of the first notification message, a notification title of the first notification message, the notification time of the second notification message, and a notification title of the second notification message; or, the target notification message may include only the WeChat icon, the notification time of the second notification message, and the notification title of the second notification message.

In some other embodiments, the message push method further includes: storing, in the storage area, an association relationship between the application identifier of the target application and a message count of notification messages corresponding to the target application. For example, if the target notification message of the target application is received, the first terminal searches whether the message count corresponding to the application identifier of the target application has been stored in the storage area. If yes, the message count is increased by 1; if not, an association relationship between the application identifier of the target application and the message count is added into the storage area, and an initial value of the message count is 0. After the association relationship between the application identifier of the target application and the message count is added, the message count is increased by 1.

It can be understood that the second terminal (such as a wristband) generally has a relatively small screen capable of displaying limited content. Generally, the first terminal sends all details of a notification message to the second terminal, but the second terminal cannot display all the details of the notification message. In addition, if a target notification message includes excessive detailed data and a message count of the target notification message is large, a relatively large storage space may be occupied. In this case, the target notification message includes partial specific data of the notification message instead of all the specific data (such as the application icon and the notification time), thereby reducing a data volume of the target notification message pushed to the second terminal through the communication connection, and alleviating data transmission pressure. This can also effectively save storage space and avoid problems such as resource waste.

It can be understood that if the target notification message includes all the specific data of the notification message, the user is able to view all the specific data of the notification message on the second-terminal side (for example, the in-vehicle device), rather than viewing the notification message on the first-terminal side after receiving the notification message, thereby bringing great convenience to the user.

In some other embodiments, whether the target notification message includes partial or all specific data of the notification message may alternatively be determined based on a remaining space size of the storage area and a data size of the notification message of the target application. For example, if the remaining space size of the storage area is greater than or equal to 30M, and a data size of data content of all unread notification messages of the target application is less than 5M, it is determined that the target notification message includes all specific data of the unread notification messages of the target application. If the remaining space size of the storage area is less than or equal to 20M, and the data size of the data content of all the unread notification messages of the target application is greater than 5M, it is determined that the target notification message includes partial specific data of the unread notification messages of the target application, for example, the target notification message includes the application identifier of the target application and notification times of the notification messages.

In this embodiment of this application, the target notification message of the target application can be obtained in the following forms:

1. Access (obtain) unread notification messages of all applications stored in the first terminal by invoking a preset interface (for ease of description, the unread notification messages of all applications are referred to as first data below), and then selecting, by using a target program, the notification message of the target application included in the first data.

For example, through an interface provided by Android for obtaining notification message details (for example, a NotificationListenerService interface) and by using a preset obtaining method (for example, a getActiveNotifications( )method), a notification message stored on the first-terminal side is read into a notification message array class (such as a StatusBarNotification[ ] array class). Then, specific data of the notification message is obtained by invoking the StatusBarNotification[ ]. It can be understood that each element (for example, StatusBarNotification[0] or StatusBarNotification[1]) in the StatusBarNotification[ ] array class is one notification message on the first-terminal side. In other words, the StatusBarNotification[ ] array class includes notification messages (first data) of all applications on the first-terminal side. For example, if there are 10 unread notification messages on the first-terminal side, an array length of the StatusBarNotification[ ] array class is 10, that is, the StatusBarNotification[ ] array class includes all specific data of the 10 unread notification messages.

Figure 2G:
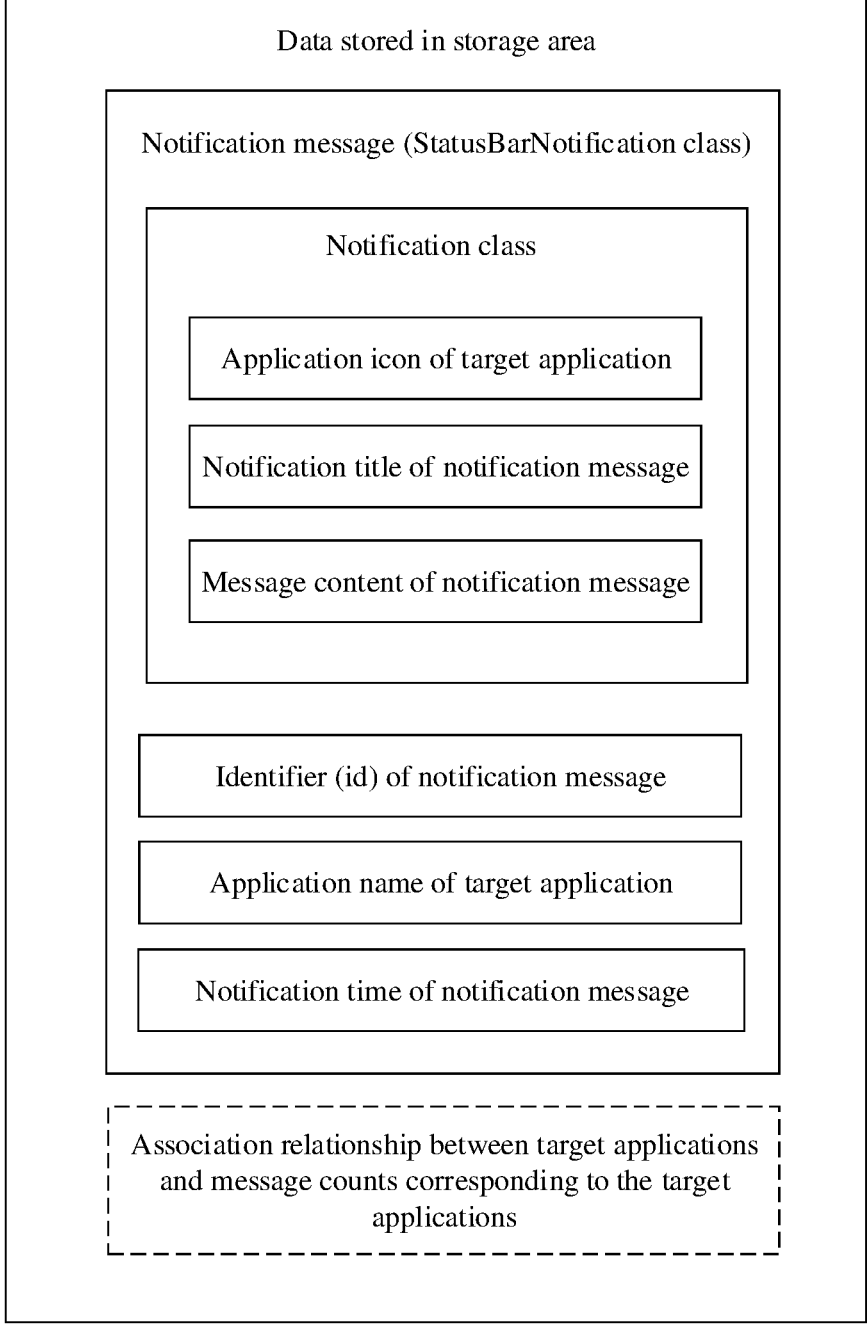
FIG. 2G is a schematic diagram of data stored in a storage area according to an embodiment of this application.

It can be understood that as shown in FIG. 2G, attributes of the StatusBarNotification class include: notification message class (for example, notification class), notification message id, application identifier of an application corresponding to the notification message, and notification time of the notification message. The attributes of the notification class further include an application icon of the application corresponding to the notification message, a notification title of the notification message, and message content of the notification message. Therefore, specific data of the i-th notification message in the notification message array class may be obtained by using the StatusBarNotification[i].getxx( )method (where i is an integer smaller than the array length of the message notification array class). For example, an id of the i-th notification message is obtained by using the .getId( )method; an application identifier of the i-th notification message is obtained by using the .getPackageNage( ) method; a notification post time of the i-th notification message is obtained by using the .getPostTime( ) method; a notification class object of the i-th notification message is obtained by using the .getNotification( )method; and then the application icon of the target application, the notification title of the notification message, and the message content of the notification message are obtained by using the notification class object. A StatusBarNotification class described elsewhere in this specification is the same as that described here.

In this embodiment of this application, an identifier of the application to which the notification message belongs can be obtained by using the .getPackageNage( )method, and then it is determined whether the application of the notification message belongs to the target application, so as to count (obtain) through statistics collection a message count of notification messages corresponding to the target application.

It can be understood that during storing of the target notification message into the storage area (that is, step 202), the message count of notification messages corresponding to the target application may be obtained through statistics collection. Alternatively, before the first terminal pushes the target notification message in the storage area to the second terminal (that is, step 203), the message count is obtained through statistics collection. For example, in some other embodiments, the target notification message does not include the message count. If the message count is to be sent to the second terminal, the message count may be obtained through statistics collection before the target notification message is pushed to the second terminal.

In this embodiment of this application, the foregoing target program is used to obtain the target notification message corresponding to the target application in the first data (the description of the target program elsewhere in this specification is consistent with that described herein).

For example, in the target program, it is determined, through the .getPackageNage( ) method, whether an application identifier of a notification message included in the StatusBarNotification[ ] array class is included in the application identifier of the target application. If so, the specific data of the notification message is obtained by using one or more of the .getId( )method, .getPostTime( )method, and .getNotification( )method, so as to obtain the target notification message of the target application.

For example, it is assumed that the target notification message includes the application identifier of the target application and the notification time of the notification message. The StatusBarNotification[ ] array class includes two notification messages of WeChat and one notification message of the Baidu browser. The target application includes WeChat but not the Baidu browser. In this case, an application identifier of the i-th (i is less than or equal to 2) notification message is obtained through StatusBarNotification[i].getPackageNage( ) so as to determine whether the application identifier is WeChat. If so, the notification time of the i-th notification message is obtained by using the .getPostTime( )method, so as to obtain the target notification message of WeChat (the target application).

It can be understood that the first data stored by the first terminal is updated in real time, and first data obtained by invoking the NotificationListenerService interface is first data of a specific moment. Therefore, a refresh rule needs to be set for storing, into the storage area, the target notification message of the target application in the latest first data.

For example, the NotificationListenerService interface may be invoked once at regular intervals to obtain first data again, and the target notification message of the target application included in the first data can be selected by using the target program, that is, the target notification message stored in the storage area is updated once at regular intervals. For example, the notification message of the target application included in the first data is obtained once every one minute.

For example, alternatively, the NotificationListenerService interface may be invoked once to obtain the first data only when it is determined that the first terminal and the second terminal are in a second connection state, and the target notification message included in the first data is selected by using the target program. It can be understood that, for the description of the second connection state, reference may be made to the related detailed description of step 203 in this embodiment of this application, which is not described in detail herein again.

It can be understood that the foregoing method for updating the target notification message in the storage area at regular intervals, or the method for invoking the NotificationListenerService interface once to obtain the notification message of the target application only when it is determined that the first terminal and the second terminal are in a second connection state is merely used as an example. Other methods may alternatively be used to update the target notification message in the storage area, which is not limited in this embodiment of this application.

In this embodiment of this application, obtaining the notification messages of all the applications of the first terminal by using the preset interface and then selecting the target notification message corresponding to the target application can avoid an action of monitoring notification messages, simplify a program flow, effectively alleviate the memory running pressure, and reduce performance loss (for example, save power).

2. Inherit a notification message parent class to create a custom notification message subclass, and obtain the notification message of the target application by inheriting and overwriting a listening method of the parent class by the subclass.

It can be understood that the notification message parent class (for example, the NotificationListenerService interface class for obtaining notification message details) includes a notification message listening method (for example, an onNotificationPosted( )method). If the first terminal receives the notification message (StatusBarNotification), the onNotificationPosted( )method is then invoked and the notification message is transferred to the onNotificationPosted( )method in the form of parameter. For example, the notification message of the first application is recorded as sdn, and the notification message sdn is transferred to the onNotificationPosted( )method in the form of parameter by using onNotificationPosted(sdn).

In this way, the notification message parent class NotificationListenerService can be inherited, to create the custom notification message subclass. The notification message (StatusBarNotification class) of the first terminal is obtained through listening on the subclass, and the onNotificationPosted( )method can be rewritten in this subclass to implement a function the same as that of the target program, so as to obtain the target notification message corresponding to the target application from the notification messages of the first terminal. For the description of the StatusBarNotification class and the target program, reference may be made to the related detailed description elsewhere in this specification, which is not described in detail herein again.

In this embodiment of this application, the target notification message obtained by using the notification message listening method based on the created subclass is eventually added into the storage area. For example, each time one notification message (StatusBarNotification) is received, the notification message is transferred to the onNotificationPosted( )method in the form of parameter, to obtain a target notification message of the notification message, and then a notification message array class StatusBarNotification[ ] is used to accept the target notification message. Then, the notification message array class is stored into the storage area. In this way, the target notification message of the target application is stored in the storage area.

It can be understood that the descriptions about all the specific data of the notification message including the application identifier of the application sending the notification message, the application icon of the application sending the notification message, the id of the notification message, the notification title of the notification message, the message content of the notification message, and the notification time of the notification message are only examples, and all the specific data of the notification message may alternatively include more or less data content, which is not limited in this embodiment of this application.

In this embodiment of this application, the target notification messages of the target application stored in the storage area are all unread notification messages.

For example, the unread notification message may be a notification message for which the first-terminal side has not received a tap operation by the user on the target notification message (which may also be understood as a notification message that the user has not tapped to view). For example, a tapped notification message may be deleted by invoking a tapped notification message auto cancel (for example, setAutoCancel( )method). Alternatively, a NotificationManager class for managing notification messages may be created for managing the notification message array class in the storage area. For example, referring to FIG. 1H and FIG. 1J again, when the NotificationManager class is used to detect the notification message being tapped, the id of the notification message is obtained, and the id is transferred in the form of parameter to the method for deleting a specified notification message corresponding to a specified id (for example, NotificationManager.cancel(int id) method), so as to delete the notification message from the storage area. Alternatively, when the NotificationManager class is used to detect the notification message being tapped, the id of the notification message is obtained, so as to obtain, based on the id of the notification message, an application identifier of a target application of a notification message corresponding to the id, and then obtain, based on the application identifier, an id of all notification messages corresponding to the application identifier. The IDs of all the notification messages are transferred into the NotificationManager.cancel(int id) method one by one, so as to delete all the notification messages corresponding to the application identifiers from the storage area.

For example, in some other embodiments, the unread notification message may alternatively be a notification message for which a pull-down action operated by the user on the display of the first terminal has not been received, or may be understood as a notification message that the user has not tapped to view. For example, the user pull-down action monitoring method (such as the onPullDownRefresh( )method) may be used to monitor a pull-down action. Referring to FIG. 1I again, after the pull-down action is detected, the method for clearing all notification messages (for example, using the NotificationManager class for managing notification messages to invoke the cancelALL( )method for clearing all notification messages) is invoked to delete the notification message array class from the storage area.

It can be understood that the target notification message stored in the first terminal is updated in real time, including: adding a new notification message to the notification message array class StatusBarNotification[ ] after the new notification message is received; and automatically deleting a target notification message by invoking the tapped notification message auto cancel method (for example, setAuto-Cancel( )method) after the notification message is tapped to view. In this embodiment of this application, a refresh rule is set for storing latest target notification messages into the storage area. Therefore, if the StatusBarNotification[ ] array class of notification messages on the first-terminal side is obtained by using the getActiveNotifications( )method, because notification messages that have been tapped to view are automatically deleted from the StatusBarNotification[ ] array class, target notification messages added to the storage area are also updated. In this way, whether a tap operation is performed on the notification messages in the storage area does not need to be monitored by setting a program.

In some other embodiments of this application, the notification time of the target notification message falls within a first preset time range. For example, if the first preset time range is within 5 minutes before the current time, the notification time of the target notification messages is greater than or equal to the current time minus 5 minutes. It can be understood that the first preset time range can also be understood as the first preset duration described in other embodiments of this application.

For example, a judgment function module for determining whether the notification time of the notification message falls within the first preset time range is set in the target program, so as to select a target notification message, whose notification time falls within the first preset time range, of a target application, and store the target notification message into the storage area.

203: If it is determined that the first terminal and the second terminal are in the second connection state, the first terminal pushes the target notification message in the storage area to the second terminal.

In this embodiment of this application, if the first terminal and the second terminal are in the second connection state, the first terminal and the second terminal recover to a normal communication connection state, and the first terminal may send a message to the second terminal. In this way, an unread notification message received when the first terminal and the second terminal are in the second connection state is pushed to the second terminal, so as to prevent the user from missing the unread notification message.

For example, the second connection state may be the following cases:

1. The second connection state includes that the Bluetooth connection state of the first terminal and the second terminal changes from the Bluetooth connection being disconnected to the Bluetooth connection being successfully established. It can be understood that the Bluetooth connection between the first terminal and the second terminal has ever been established, and after the Bluetooth connection between the first terminal and the second terminal is disconnected, an unread notification message of the first terminal is stored in the storage area during disconnection of the Bluetooth connection. After the Bluetooth connection between the first terminal and the second terminal is established again, the first terminal may push data in the storage area to the second terminal through the Bluetooth connection.

2. The second connection state includes that a connection between the first terminal and the second terminal has been established via Bluetooth, and a message connection state of the first terminal and the second terminal changes from a message connection being disconnected to the message connection being successfully established. It can be understood that in the period in which the message connection between the first terminal and the second terminal is disconnected, the second terminal disables part of radio frequency resources used for the message connection to the second terminal. After the second terminal enables the radio frequency resource again, the first terminal may re-establish a message connection to the second terminal.

For example, the second terminal is in the do-not-disturb mode, so that the message disconnection between the first terminal and the second terminal is disconnected. After the second terminal turns off the do-not-disturb mode, the second terminal sends a preset message connection establishment command to the first terminal (for example, the preset message connection establishment command is an AT+CFUN=1 command), so as to re-establish the message connection between the first terminal and the second terminal.

3. The second connection state includes that a connection between the first terminal and the second terminal has been established via Bluetooth, the message connection between the first terminal and the second terminal is not disconnected, and the first terminal changes from not being allowed to push the notification message of the first application to the second terminal to being allowed to push the notification message of the first application to the second terminal.

For example, the second terminal includes a function of the do-not-disturb mode, and if the second terminal is in the do-not-disturb mode, the message connection between the first terminal and the second terminal is not disconnected. However, by default, when the first terminal determines that the second terminal is in the do-not-disturb mode, the first terminal is not allowed to push the notification message of the first application to the second terminal. In this case, the second connection state is that the second terminal changes from turning on the do-not-disturb mode to turning off the do-not-disturb mode, the first terminal is allowed to push the notification message of the first application to the second terminal, the connection between the first terminal and the second terminal has been established via Bluetooth, and the message connection between the first terminal and the second terminal is not disconnected.

Alternatively, the user manually changes a setting of not allowing the first terminal to push the notification message of the first application when the second terminal is in the do-not-disturb mode to a setting of allowing the first terminal to push the notification message of the first application to the second terminal when the second terminal is in the do-not-disturb mode. In this case, the second connection state is that the second terminal in the do-not-disturb mode receives from the user an operation instruction for changing the setting of not allowing the first terminal to push the notification message of the first application when the second terminal is in the do-not-disturb mode to the setting of allowing the first terminal to push the notification message of the first application to the second terminal when the second terminal is in the do-not-disturb mode; the first terminal is connected to the second terminal through Bluetooth; and the message connection between the first terminal and the second terminal is not disconnected. For example, as shown in FIG. 2B, the user changes a button of the messaging application program from on to off. If a notification message related to messaging is stored in the storage area at that time, the notification message of the messaging stored in the storage area is pushed to the second terminal.

In some other embodiments, the target notification message of the target application includes partial specific data of the notification message. For example, the target notification message includes an application icon of the target application sending the target notification message, an id of the target notification message, and a message title of the target notification message. After the first terminal pushes the target notification message to the second terminal and the second terminal receives the target notification message, it may be determined whether the second-terminal side has detected tapping on the target notification message by the user. If yes, the second terminal requests, through the communication connection, to obtain all specific data of the notification message corresponding to the id of the target notification message from the first terminal. After receiving the request, the first terminal searches for all the specific data of the notification message corresponding to the id of the target notification message, and sends all the specific data to the second terminal.

In some other embodiments, the foregoing step 203 further includes: pushing to the second terminal the association relationship between the application identifier of the target application and the message count of notification messages corresponding to the target application stored in the storage area.

In this embodiment of this application, the first terminal may establish a communication connection to the second terminal by using a Bluetooth technology, or may establish a communication connection to the second terminal by using a universal serial bus (Universal Serial Bus, USB) technology, a Wi-Fi technology, or a near field communication (near field communication, NFC) technology.

It can be understood that if the first terminal establishes a communication connection to the second terminal by using the Wi-Fi technology or the NFC technology, the first connection state may be correspondingly the following case: the USB, Wi-Fi, or NFC connection between the first terminal and the second terminal is disconnected. Alternatively, a connection between the first terminal and the second terminal has been established through USB, Wi-Fi, or NFC, and the second terminal disables part of radio frequency resources used for the message connection to the first terminal for some causes, in other words, the message connection between the first terminal and the second terminal is disconnected. Alternatively, a connection between the first terminal and the second terminal has been established through USB, Wi-Fi, or NFC, the message connection between the first terminal and the second terminal is not disconnected, and the first terminal is not allowed to push the notification message of the first application to the second terminal. The second connection state may correspond to the following cases: the USB, Wi-Fi, or NFC connection state between the first terminal and the second terminal changes from a USB, Wi-Fi, or NFC connection being disconnected to the USB, Wi-Fi, or NFC connection being successfully established. Alternatively, a connection between the first terminal and the second terminal has been established through USB, Wi-Fi, or NFC, and a message connection state of the first terminal and the second terminal changes from a message connection being disconnected to the message connection being successfully established. Alternatively, a connection between the first terminal and the second terminal has been established through USB, Wi-Fi, or NFC, the message connection between the first terminal and the second terminal is not disconnected, and the first terminal is allowed to push the notification message of the first application to the second terminal. Related descriptions of the target application and the target notification message in a scenario of the communication connection between the first terminal and the second terminal being established by using the Wi-Fi technology or NFC technology are consistent with related descriptions of the target application and the target notification message in a scenario of the communication connection between the first terminal and the second terminal being established through Bluetooth; and details are not described in detail herein again.

It can be understood that the first terminal may alternatively establish a communication connection to the second terminal by using other technologies, and this embodiment of this application does not constitute any limitation on a manner of establishing a communication connection between the first terminal and the second terminal.

204. After the data in the storage area is pushed to the second terminal, delete the data from the storage area.

It can be understood that deleting the data from the storage area may include deleting data content from the storage area but not destroying the storage area, or deleting the data in the storage area may include destroying the storage area (which can also be understood as clearing the storage area). It can be understood that when the storage area is destroyed, the data in the storage area is also deleted.

For example, the dynamic partition (that is, the storage area) with the target capacity in the RAM of the first terminal may be destroyed by invoking a specified-memory release method (for example, ontrimmemory( )method). It can be understood that the data in the storage area may alternatively be deleted by using other methods, which is not limited in this embodiment of this application.

In some other embodiments, if the method for obtaining the target notification message of the target application is as follows: if it is determined that the first terminal and the second terminal are in the second connection state, and the NotificationListenerService interface is invoked once to obtain the target notification message of the target application, the storage area may not be created, and the target notification message may not be stored into the storage area. Instead, after the target notification message is obtained, the target notification message is directly pushed to the second terminal, and therefore the storage area does not need to be created. Therefore, after the first terminal pushes the target notification message to the second terminal, because there is no storage area or data in the storage area is empty, step 204 may not need to be executed to delete the data from the storage area.

Generally, when the first terminal and the second terminal are in the first connection state (the first terminal and the second terminal are communicatively disconnected, or the message connection between the first terminal and the second terminal is partially or totally disconnected), the first terminal cannot push a notification message to the second terminal. When the connection state between the first terminal and the second terminal is recovered to the second connection state (both the communication connection and the message connection are established between the first terminal and the second terminal), the first terminal no longer pushes to the second terminal an unread notification message received during the first connection state, featuring poor human-computer interaction performance. Therefore, the user cannot receive all unread notification messages received during the first connection state, and the user misses important notification messages consequently.

However, according to the message push method provided in this embodiment of this application, if the first terminal and the second terminal are in the first connection state, the target notification message of the target application of the first terminal is stored into the storage area (for example, as shown in FIG. 1D). Therefore, when the first terminal and the second terminal are in the second connection state (both the communication connection and the message connection are established between the first terminal and the second terminal), the target notification message is pushed to the second terminal through the communication connection (for example, as shown in FIG. 1E). This prevents the user from missing some important notification messages, and improves human-computer interaction performance of the first terminal and the second terminal.

It can be understood that the message push method in this embodiment of this application may be executed by the first terminal, or the message push method in this embodiment of this application may be executed by a message push module of the first terminal. The message push module may be a hardware component in the first terminal. For example, the message push module may be a chip in the first terminal for executing the message push method provided by this application. Alternatively, the message push module may be a software function module provided by an existing hardware component in the first terminal and capable of executing the message push method provided by this application. For example, the message push module is one application program. This embodiment of this application does not constitute any limitation on a specific form of the message push module.

It can be understood that, in the foregoing embodiment, the storage area is created if the first terminal and the second terminal are in the first connection state. In actual application, the first terminal may alternatively create the storage area in other cases to execute the method provided in this embodiment of this application. For details, refer to FIG. 3.

Figure 3:
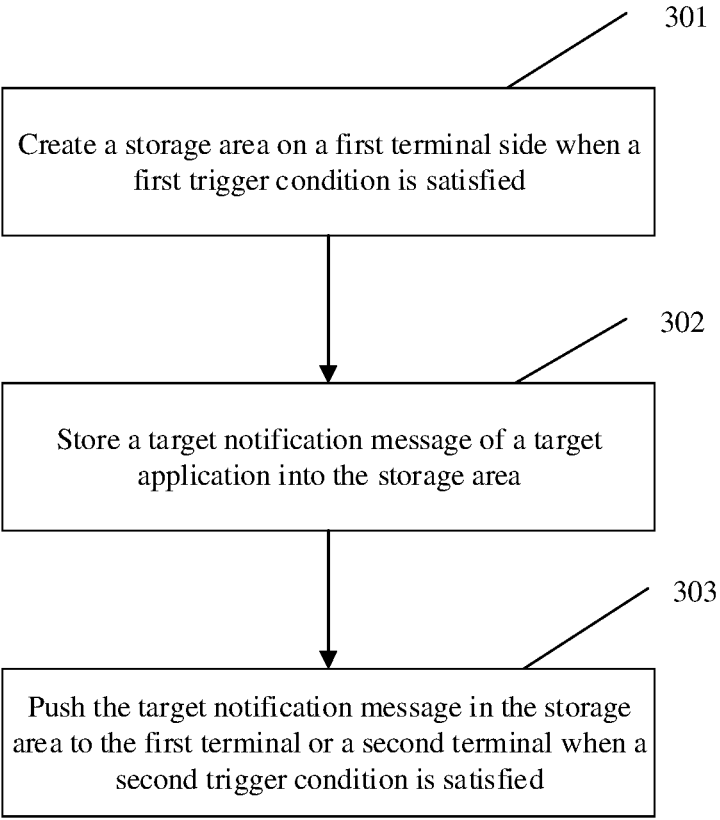
FIG. 3 is a schematic flowchart of another message push method according to an embodiment of this application.

FIG. 3 is another message push method according to an embodiment of this application. As shown in FIG. 3, the message push method includes the following steps.

301: Create a storage area on a first-terminal side when a first trigger condition is satisfied.

Optionally, the first trigger condition may include that a communication connection state between a first terminal and a second terminal is a first connection state.

For descriptions of the first terminal, the second terminal, and the first connection state, reference may be made to the related detailed descriptions (for example, step 201 in FIG. 2A) of other embodiments of this application, and details are not repeated herein.

Optionally, the first trigger condition may alternatively be that the first-terminal side receives a notification message. That is, provided that the first-terminal side receives an unread notification message, a storage area for storing the unread notification message is created. It can be understood that for notification messages stored in the storage area, if a user has not viewed a notification message for a long time (for example, the notification message has not been viewed for 24 hours) after the first terminal receives the notification message, the unread notification message stored in the storage area may be pushed to the first terminal again.

Optionally, the first trigger condition may alternatively be that the first terminal and the second terminal are in the first connection state, and the first-terminal side receives a notification message. It can be understood that if the first terminal and the second terminal are in the first connection state and the first-terminal side receives a notification message, the storage area is then created, which can avoid a waste of storage resources and increased storage burden in a case of no notification message being received during the first connection state.

It can be understood that, in addition that the first terminal and the second terminal are in the first connection state or the first-terminal side receives a notification message, the first trigger condition may alternatively be other trigger conditions (for example, if the first terminal provides a function control for manually triggering creation of the storage area by the user, the first trigger condition may alternatively be that the user taps the function control). A specific form of the first trigger condition is not limited in this embodiment of this application.

Optionally, the created storage area may be a dynamic partition with a target capacity size requested from a RAM in a memory of the first terminal. For a detailed description about requesting a dynamic partition with a target capacity size from the RAM in the memory of the first terminal, reference may be made to the related description (for example, the detailed description related to creation of a storage area shown in step 201 in FIG. 2A) in other embodiments of this application; and details are not described in detail herein again.

It can be understood that the RAM partition can also be understood as a main memory, and as an internal memory that directly exchanges data with the CPU, has a fast read and write speed. Therefore, using the dynamic partition (the storage area) of the RAM to store a target notification message of a target application can improve a speed of reading and writing the target notification message, speed up program responding time, save space of the magnetic disk, reduce performance loss, and improve user experience.

Optionally, the created storage area may alternatively be a storage space with a target capacity requested from a magnetic disk of the first terminal.

In this embodiment of this application, the storage area may be created in the memory or magnetic disk of the first terminal, or the storage area may be created in other storage areas of the first terminal, which is not limited in this embodiment of this application.

302: Store the target notification message of the target application into the storage area.

For descriptions of the target application and the target notification message, reference may be made to the related descriptions (for example, step 202 shown in FIG. 2A) in other embodiments of this application, and details are not described in detail herein again.

Optionally, the target notification messages of the target application in the storage area are all unread notification messages on the first-terminal side. For description of the unread notification message, reference may be made to the related description (for example, related description of step 202 in FIG. 2A) in other embodiments of this application, and details are not described in detail herein again.

Optionally, a notification time of the target notification message of the target application in the storage area falls within a first preset time range. For description of the first preset time range, reference may be made to the related detailed description (for example, step 202 in FIG. 2A) in other embodiments of this application, and details are not described in detail herein again.

303: Push the target notification message in the storage area to the first terminal or the second terminal when a second trigger condition is satisfied.

For example, the second trigger condition may be that the first terminal and the second terminal are in a second connection state, which then triggers the first terminal to push data in the storage area to the second terminal.

For detailed description of the second connection state, reference may be made to the related detailed description (for example, the related description of the second connection state in step 203 in FIG. 2A) in other embodiments of this application, and details are not described in detail herein again.

For example, the second trigger condition may alternatively be that the target notification message of the target application on the first-terminal side has not been viewed for a second preset time; in this case, the target notification message in the storage area is pushed to the first terminal and/or the second terminal again. For example, the second preset time is 24 hours, and if a current time minus the notification time of the target notification message is greater than 24 hours, the target notification message in the storage area is pushed to the first terminal again.

In this embodiment of this application, the second trigger condition may alternatively be other conditions, and a specific form of the second trigger condition is not limited in this embodiment of this application.

In some other embodiments, after the pushing the target notification message in the storage area to the first terminal or the second terminal, the method further includes: deleting data from the storage area. This reduces overheads of a memory of the first terminal or saves space of a magnetic disk of the first terminal, and improves operation efficiency of the first terminal.

It can be understood that in some other embodiments, alternatively, the data in the storage area may not be deleted after the target notification message in the storage area is pushed to the first terminal or the second terminal. The data is deleted from the storage area only after the notification message is tapped or pulled down to view on the first-terminal side or the second-terminal side.

For detailed description about deletion of the data from the storage area, reference may be made to the related description (for example, step 204 in FIG. 2A) in other embodiments of this application, and details are not described in detail herein again.

According to the message push method provided in this embodiment of this application, the target notification message is stored into the storage area under the first trigger condition, and then the target notification message is pushed to the second terminal under the second trigger condition, so that the second terminal displays the target notification message. In this way, the target notification message is pushed to the user in a timely manner, thereby preventing the user from missing some important notification messages and improving human-computer interaction performance of the first terminal and the second terminal.

It can be understood that the message push method in this embodiment of this application may be executed by the first terminal, or the message push method in this embodiment of this application may be executed by a message push module of the first terminal. The message push module may be a hardware component in the first terminal. For example, the message push module may be a chip in the first terminal for executing the message push method provided by this application. Alternatively, the message push module may be a software function module provided by an existing hardware component in the first terminal and capable of executing the message push method provided by this application. For example, the message push module is one application program. This embodiment of this application does not constitute any limitation on a specific form of the message push module.

It can be understood that, in the foregoing embodiment, if a communication connection between the first terminal and the second terminal can be established by using a Bluetooth, Wi-Fi, or NFC technology and the first trigger condition is satisfied, the storage area is created, and the method provided in this embodiment of this application is performed. In practical application, the method provided in this embodiment of this application may be further described by using an example that the communication connection can be established between the first terminal and the second terminal via Bluetooth, the first terminal does not turn on a do-not-disturb mode, and the storage area is created when the Bluetooth connection between the first terminal and the second terminal is disconnected. For details, refer to FIG. 4.

Figure 4:
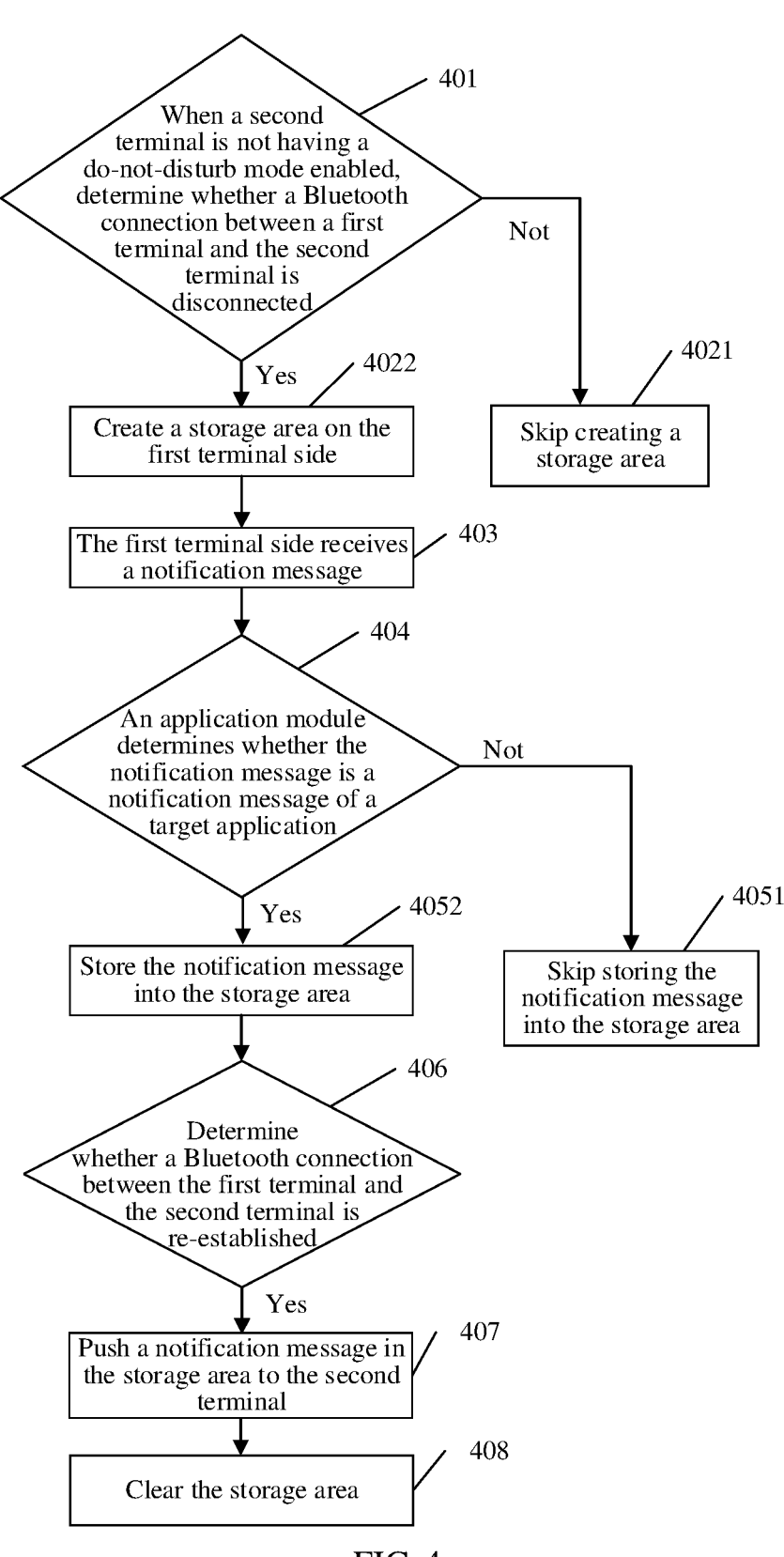
FIG. 4 is a schematic flowchart of another message push method according to an embodiment of this application.

FIG. 4 is a message push method according to an embodiment of this application. As shown in FIG. 4, the message push method includes the following steps:

401: When a second terminal is not having a do-not-disturb mode enabled, determine whether a Bluetooth connection between a first terminal and the second terminal is disconnected.

For detailed descriptions of the first terminal, the second terminal, the do-not-disturb mode, and establishment of a communication connection via Bluetooth, reference may be made to related descriptions (for example, step 201 in FIG. 2A) in other embodiments of this application, and details are not described in detail herein again.

4021: If it is determined that the Bluetooth connection between the first terminal and the second terminal is not disconnected, skip creating a storage area.

4022: If it is determined that the Bluetooth connection between the first terminal and the second terminal is disconnected, create a storage area on the first-terminal side.

For a detailed description about creation of the storage area, reference may be made to the related description (for example, step 202 in FIG. 2A) in other embodiments of this application, and details are not described in detail herein again.

403: The first-terminal side receives a notification message.

404: An application module determines whether the notification message belongs to a notification message of a target application.

It can be understood that the application module can also be construed as the target program described in other embodiments of this application (for example, the description about the target program in step 202 in FIG. 2A). For a detailed description of the application module, reference may be made to the related description of the target program, and details are not described in detail herein again.

In this embodiment of this application, the target application may be phone, messaging, and WeChat application programs. For a detailed description of the target application, reference may be made to the related descriptions in the embodiments of this application.

4051: If it is determined that the notification message does not belong to the notification message of the target application, skip storing the notification message into the storage area.

4052: If it is determined that the notification message belongs to the notification message of the target application, store part or all of detailed content of the notification message into the storage area.

For a description of part or all of the detailed content of the notification message, reference is made to the related description (for example, step 202 in FIG. 2A) in other embodiments of this application, and details are not described in detail herein again.

406: Determine whether a Bluetooth connection between the first terminal and the second terminal is re-established.

407: Push a notification message in the storage area to the second terminal if it is determined that the Bluetooth connection has been established between the first terminal and the second terminal.

In this embodiment of this application, the second terminal displays the notification message after the notification message in the storage area is pushed to the second terminal and the second terminal receives the notification message. A specific manner of displaying the notification message by the second terminal is not limited in this embodiment of this application.

408: After the notification message in the storage area is pushed to the second terminal, clear the storage area.

For a detailed description about clearing of the storage area, reference may be made to the related description (for example, step 204 in FIG. 2A) in other embodiments of this application, and details are not described in detail herein again.

It can be understood that the foregoing scenario where the second terminal does not turn on the do-not-disturb mode and the Bluetooth connection between the first terminal and the second terminal is disconnected is only an example, and this embodiment of this application may also be applicable to other scenarios. For example, in some other embodiments, the scenarios of step 401 to step 4022 may further include creating a storage area on the first-terminal side if it is determined that the second terminal has turned on the do-not-disturb mode. Step 406 and step 407 may further include: pushing the notification message in the storage area to the second terminal if it is determined that the first terminal has turned off the do-not-disturb mode and the Bluetooth connection between the first terminal and the second terminal has been established.

It can be understood that the method provided by the foregoing embodiment of this application can be executed by any electronic device (the first terminal) having a communication connection function (for example, a Bluetooth communication connection, a Wi-Fi communication connection, a USB communication connection, or an NFC communication connection technology). For example, the electronic device includes a mobile terminal, a tablet computer, a desktop computer, a laptop computer, a handheld computer, a notebook computer, an ultra-mobile personal computer (ultra-mobile personal computer, UMPC), and the like.

Figure 5:
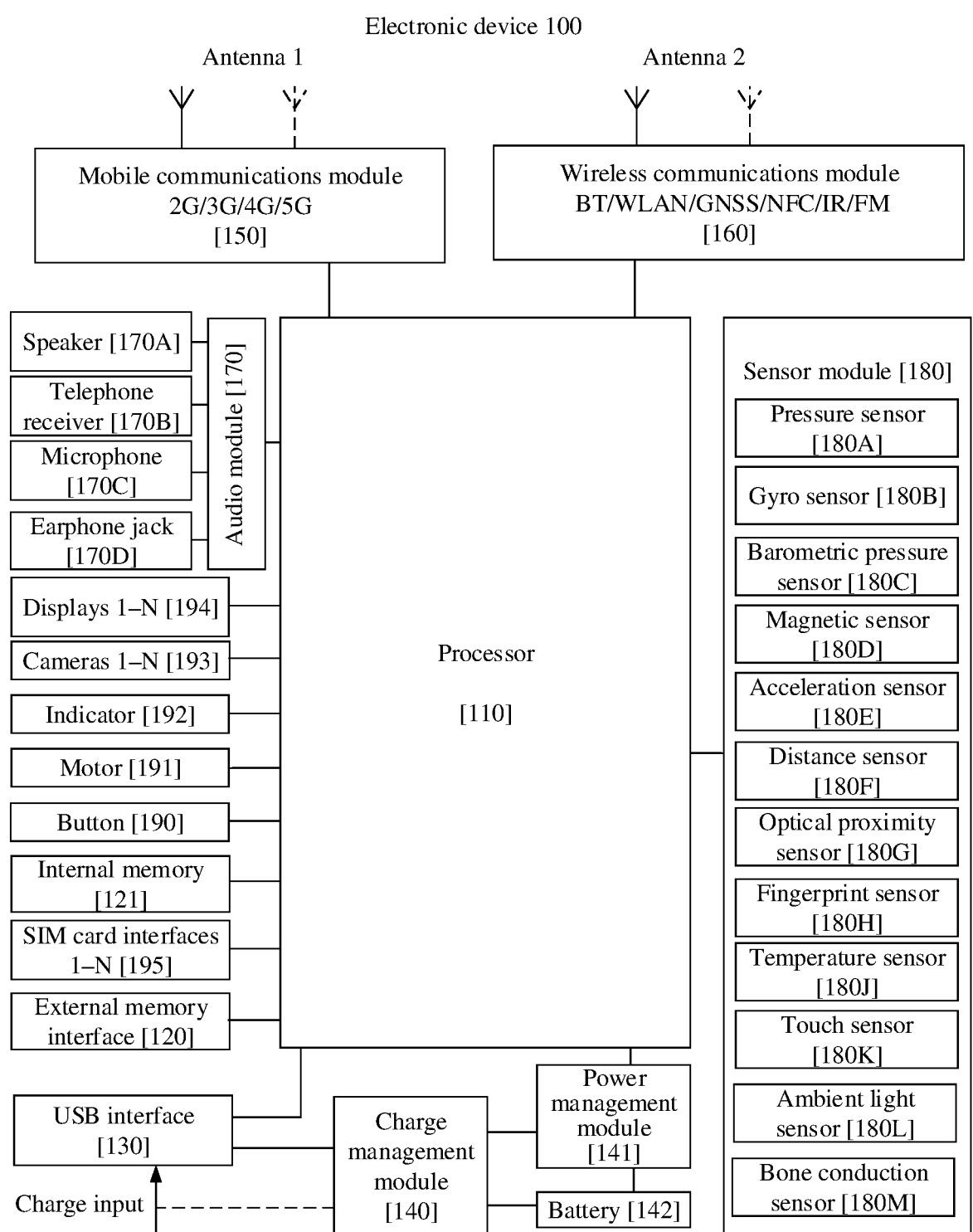
FIG. 5 is a schematic structural diagram of an electronic device 100 according to an embodiment of this application.

For example, referring to FIG. 5, FIG. 5 is a schematic structural diagram of an electronic device 100 provided by an embodiment of this application, and a mobile terminal serving as the electronic device is used as an example for detailed description below.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device 100. In some other embodiments of this application, the electronic device 100 may include more or fewer components than shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components or integrated in one or more processors.

A controller may be a nerve center and command center of the electronic device 100. The controller may generate an operation control signal according to an instruction operation code and a timing signal, to complete control of instruction fetching and execution.

A memory may be further provided in the processor 110 for storing instructions and data. In some embodiments, the memory in the processor 110 is a cache. The memory may store instructions or data recently used or repeatedly used by the processor 110. If the processor 110 needs to use the instruction or data again, the processor 110 can directly invoke the instruction or data from the memory. This avoids repeated access and reduces a waiting time of the processor 110, thereby improving efficiency of a system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (derail clock line, SCL). In some embodiments, the processor 110 may include multiple sets of I2C buses. The processor 110 may be coupled to the touch sensor 180K, a charger, a flash, the camera 193, and the like by using different I2C bus interfaces. For example, the processor 110 may be coupled to the touch sensor 180K by using the I2C interface, so that the processor 110 and the touch sensor 180K communicate through the I2C bus interface to implement a touch function of the electronic device 100.

The I2S interface may be used for audio communication. In some embodiments, the processor 110 may include multiple sets of I2S buses. The processor 110 may be coupled to the audio module 170 by using an I2S bus to implement communication between the processor 110 and the audio module 170. In some embodiments, the audio module 170 may transmit an audio signal to the wireless communications module 160 through the I2S interface, so as to implement a function of answering calls through a Bluetooth earphone.

The PCM interface may also be used for audio communication to sample, quantize, and encode an analog signal. In some embodiments, the audio module 170 and the wireless communications module 160 may be coupled by using a PCM bus interface. In some embodiments, the audio module 170 may alternatively transmit an audio signal to the wireless communications module 160 through the PCM interface, so as to implement a function of answering calls through a Bluetooth earphone. Both the I2S interface and the PCM interface may be used for audio communication.

The UART interface is a universal serial data bus used for asynchronous communication. The bus may be a bidirectional communication bus that converts to-be-transmitted data between serial communication and parallel communication. In some embodiments, the UART interface is generally configured to connect the processor 110 to the wireless communications module 160. For example, the processor 110 communicates with a Bluetooth module of the wireless communications module 160 through the UART interface, to implement a Bluetooth function. In some embodiments, the audio module 170 may transmit an audio signal to the wireless communications module 160 through the UART interface, so as to implement a function of playing music through a Bluetooth earphone.

The MIPI interface may be configured to connect the processor 110 to the display 194, the camera 193, and other peripheral devices. The MIPI interface includes a camera serial interface (camera serial interface, CSI), a display serial interface (display serial interface, DSI), and the like. In some embodiments, the processor 110 communicates with the camera 193 by using the CSI interface, thereby implementing a shooting function of the electronic device 100. The processor 110 communicates with the display 194 by using the DSI interface, thereby implementing a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to USB specifications, and may be specifically a mini USB interface, a micro USB interface, a USB type-C interface, or the like. The USB interface 130 may be used for connecting a charger to charge the electronic device 100, or may be used for data transmission between the electronic device 100 and a peripheral device. The USB interface 130 may also be used for connecting a headset, to play audio by using the headset. The interface may alternatively be used to connect other electronic devices, for example, an AR device.

It may be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from those in the foregoing embodiment or a combination of a plurality of interface connection manners.

The charge management module 140 is configured to receive a charging input from a charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 100. When the charging management module 140 is charging the battery 142, power may be further supplied to the electronic device by using the power management module 141.

The power management module 141 is configured to connect to the battery 142, the charging management module 140, and the processor 110. The power management module 141 receives an input from the battery 142 and/or the charge management module 140, and supplies power to the processor 110, the internal memory 121, the external storage, the display 194, the camera 193, the wireless communications module 160, and the like. The power management module 141 may be further configured to monitor parameters such as a battery capacity, a quantity of battery cycles, and a battery health status (leakage and impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. In addition, different antennas may be multiplexed to improve utilization of the antennas. For example, the antenna 1 may multiplex a diversity antenna used in a wireless local area network. In some other embodiments, the antenna may be used in combination with a tuning switch.

The mobile communications module 150 may provide wireless communication solutions for use on the electronic device 100, including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transmit the processed electromagnetic wave to a modem processor for demodulation. The mobile communications module 150 may further amplify a signal modulated by the modem processor, and convert the signal into an electromagnetic wave and radiate the electromagnetic wave by using the antenna 1. In some embodiments, at least some functional modules of the mobile communications module 150 may be provided in the processor 110. In some embodiments, at least some functional modules of the mobile communications module 150 may be provided in a same device with at least some modules of the processor 110.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is sent to the application processor. The application processor outputs a sound signal by using an audio device (not limited to the loudspeaker 170A, the telephone receiver 170B, and the like), or displays an image or a video by using the display 194. In some embodiments, the modem processor may be a separate device. In some other embodiments, the modem processor may be separate from the processor 110 and arranged in a same device with the mobile communications module 150 or another functional module.

The wireless communications module 160 may provide wireless communication solutions for the electronic device 100, including wireless local area network (wireless local area networks, WLAN) (for example, wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), infrared (infrared, IR) technology, and the like. The wireless communications module 160 may be one or more devices integrating at least one communication processing module. The wireless communications module 160 receives an electromagnetic wave by using the antenna 2, performs frequency modulation and filtering processing on an electromagnetic wave signal, and sends a processed signal to the processor 110. The wireless communications module 160 may also receive a to-be-sent signal from the processor 110, perform frequency modulation and amplification on the signal, and convert the signal into an electromagnetic wave and radiate the electromagnetic wave by using the antenna 2.

In some embodiments, in the electronic device 100, the antenna 1 is coupled to the mobile communications module

150, and the antenna 2 is coupled to the wireless communications module 160, so that the electronic device 100 can communicate with a network and other devices by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like. The GNSS may include the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is an image processing microprocessor and connects to the display 194 and the application processor. The GPU is configured to perform mathematical and geometric computation for graphics rendering. The processor 110 may include one or more GPUs, which execute program instructions to generate or change display information.

The display 194 is configured to display images, videos, and the like. The display 194 includes a display panel. The display panel may use a liquid crystal display (liquid crystal display, LCD), organic light-emitting diodes (organic light-emitting diode, OLED), active-matrix organic light-emitting diodes or an active-matrix organic light-emitting diodes (active-matrix organic light emitting diode, AMOLED), flexible light-emitting diodes (flex light-emitting diode, FLED), mini-LEDs, micro-LEDs, micro-OLEDs, quantum dot light-emitting diodes (quantum dot light emitting diodes, QLED), and the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transferred to a photosensitive element of the camera through a lens, an optical signal is converted to an electrical signal, and the photosensitive element of the camera transfers the electrical signal to the ISP for processing, so that the electrical signal is converted to an image visible to a naked eye. The ISP may further perform algorithm optimization on an image noise, luminance, and complexion. The ISP may further optimize parameters such as an exposure and a color temperature of a shooting scenario. In some embodiments, the ISP may be disposed in the camera 193.

The camera 193 is configured to capture a static image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP, to convert the electrical signal to a digital image signal. The ISP outputs the digital image signals to the DSP for processing. The DSP converts the digital image signal to an image signal in a standard format such as RGB or YUV. In some embodiments, the electronic device 100 may include one or N cameras 193, where N is a positive integer greater than 1.

The digital signal processor is configured to process digital signals, including digital image signals and other digital signals. For example, when the electronic device 100 is performing frequency selection, the digital signal processor is configured to perform Fourier transform or the like on energy of frequencies.

The video codec is configured to compress or decompress a digital video. The electronic device 100 may support one or more types of video codecs. In this way, the electronic device 100 can play or record videos in a plurality of encoding formats, for example, the moving picture experts group (moving picture experts group, MPEG)1, MPEG2, MPEG3, and MPEG4.

The NPU is a neural-network (neural-network, NN) computing processor, and quickly processes input information by emulating a biological neural network structure, for example, by emulating a mode of transfer between human-brain neurons, and may further perform self-learning constantly. The NPU may be used for implementing applications such as intelligent cognition of the electronic device 100, for example, image recognition, facial recognition, speech recognition, and text understanding. A decision model provided by the embodiments of this application can also be implemented by using the NPU.

The external memory interface 120 may be configured to connect an external memory card, for example, a micro SD card, to extend a storage capacity of the electronic device 100. The external memory card communicates with the processor 110 by using the external memory interface 120, to implement a data storage function. For example, files such as music and videos are stored in the external memory card.

The internal memory 121 may be configured to store computer executable program code, where the executable program code includes instructions. The processor 110 executes various functional applications of the electronic device 100 and data processing by executing the instructions stored in the internal memory 121. The internal memory 121 may include a program storage area and a data storage area. The program storage area may store an operating system, an application program required by at least one function (for example, a sound play function or an image play function), and the like. The data storage area may store data (for example, audio data or a phone book) and the like that are created during use of the electronic device 100. In addition, the internal memory 121 may include a high-speed random access memory, and may further include a nonvolatile memory, for example, at least one magnetic disk storage device, flash memory device, or universal flash storage (universal flash storage, UFS).

The electronic device 100 may implement an audio function, for example, music playing or recording, by using the audio module 170, the loudspeaker 170A, the telephone receiver 170B, the microphone 170C, the earphone jack 170D, the application processor, and the like.

The audio module 170 is configured to convert digital audio information into an analog audio signal for outputting, and also configured to convert an analog audio input into a digital audio signal. The audio module 170 may be further configured to encode and decode an audio signal. In some embodiments, the audio module 170 may be provided in the processor 110, or some functional modules of the audio module 170 may be provided in the processor 110.

The speaker 170A, also referred to as a "loudspeaker", is configured to convert an audio electrical signal into a sound signal. The electronic device 100 may be used for listening to music or answering a hands-free call by using the speaker 170A.

The receiver 170B, also referred to as an "earpiece", is configured to convert an audio electrical signal into a sound signal. When the electronic device 100 receives a call or voice information, the telephone receiver 170B may be placed near an ear for listening to voice.

The microphone 170C, also referred to as a "mic" or "mike", is configured to convert a sound signal into an electrical signal. When making a call or sending a voice message, a user may input a sound signal into the microphone 170C by speaking close to the microphone 170C. At least one microphone 170C may be provided in the electronic device 100. In some other embodiments, the electronic device 100 may be provided with two microphones 170C, to reduce noise in addition to collecting sound signals. In some other embodiments, the electronic device 100 may alternatively be provided with three, four, or more microphones 170C to collect sound signals, reduce noise, identify sound sources, implement directional recording, and the like.

The earphone jack 170D is configured to connect a wired earphone. The earphone jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed at the display 194.

There are various types of pressure sensors 180A, for example, resistive pressure sensor, inductive pressure sensor, and capacitive pressure sensor. The capacitive pressure sensor may include at least two parallel plates made of a conductive material. When a force is applied to the pressure sensor 180A, capacitance between electrodes changes. The electronic device 100 determines pressure intensity based on a capacitance change. When a touch operation is performed on the display 194, the electronic device 100 detects strength of the touch operation by using the pressure sensor 180A. The electronic device 100 may also calculate a touch position based on a detection signal of the pressure sensor 180A. In some embodiments, touch operations that are applied to a same touch position but have different touch operation strength may correspond to different operation instructions. For example, when a touch operation whose touch operation strength is less than a first pressure threshold is applied to an icon of a messaging application, an instruction for viewing messages is executed; when a touch operation whose touch operation strength is greater than or equal to the first pressure threshold is applied to the icon of the messaging application, an instruction for creating a new message is executed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be used for image stabilization during photographing. For example, when a shutter button is pressed, the gyro sensor 180B detects a shaking angle of the electronic device 100, and calculates, based on the angle, a distance for which a lens module needs to compensate, so that the lens can move reversely to counteract the shaking of the terminal device 100, so as to implement image stabilization. The gyro sensor 180B may be further used for navigation and somatosensory game scenarios.

The barometric pressure sensor 180C is configured to measure atmospheric pressure. In some embodiments, the electronic device 100 calculates an altitude based on an atmospheric pressure value measured by the barometric pressure sensor 180C to assist positioning and navigation.

The magnetic sensor 180D includes a Hall sensor. The electronic device 100 may detect opening and closing of a clamshell or a smart cover by using the magnetic sensor 180D. In some embodiments, when the electronic device 100 is a clamshell device, the electronic device 100 may detect opening and closing of a clamshell by using the magnetic sensor 180D. Then, a feature such as automatic unlocking upon opening of the clamshell is set based on a detected opening or closing state of the smart cover or a detected opening or closing state of the clamshell.

The acceleration sensor 180E may detect magnitudes of accelerations of the electronic device 100 in various directions (generally along three axes), may detect a magnitude and direction of gravity when the electronic device 100 is static, and can be further configured to recognize a posture of the electronic device, for applications such as landscape/portrait mode switching and pedometer.

The distance sensor 180F is configured to measure a distance. The electronic device 100 may measure a distance by using infrared light or a laser. In some embodiments, in a shooting scenario, the electronic device 100 may use the distance sensor 180F to measure a distance for rapid focusing.

The optical proximity sensor 180G may include, for example, a light emitting diode (LED) and an optical detector, for example, a photodiode. The light-emitting diode may be an infrared light-emitting diode. The electronic device 100 emits infrared light outward by using the light-emitting diode, and the electronic device 100 detects infrared light reflected from nearby objects by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user is holding the electronic device 100 close to an ear to make or answer a call. In this case, the electronic device 100 automatically turns off the screen to save power. The optical proximity sensor 180G may also be used in a smart cover mode or a pocket mode to automatically perform screen unlocking or locking.

The ambient light sensor 180L is configured to sense brightness of ambient light. The electronic device 100 may adaptively adjust brightness of the display 194 based on the sensed brightness of the ambient light. The ambient light sensor 180L may be further configured to automatically adjust white balance during photographing. The ambient light sensor 180L may also cooperate with the optical proximity sensor 180G to detect whether the electronic device 100 is in a pocket to avoid accidental touches.

The fingerprint sensor 180H is configured to collect fingerprints. The electronic device 100 may implement fingerprint unlock, application access lock, fingerprint photographing, fingerprint-based call answering, and the like by using characteristics of the collected fingerprint.

The temperature sensor 180J is configured to perform temperature detection. In some embodiments, the electronic device 100 executes a temperature handling policy by using a temperature detected by the temperature sensor 180J. For example, when a temperature reported by the temperature sensor 180J exceeds a threshold, the electronic device 100 lowers performance of a processor near the temperature sensor 180J, to reduce power consumption and implement thermal protection. In some other embodiments, when a temperature is less than another threshold, the electronic device 100 heats the battery 142 to avoid abnormal shutdown of the electronic device 100 caused by a low temperature. In some other embodiments, when a temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, also referred to as a "touch control screen". The touch sensor 180K is configured to detect a touch operation applied on or near the touch sensor 180K. The touch sensor may transfer the detected touch operation to the application processor for determining a touch event type, and may provide a visual output related to the touch operation through the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal generated when a human voice vibrates a bone. The bone conduction sensor 180M may also sense human pulses to receive a blood pressure pulse signal. In some embodiments, the bone conduction sensor 180M may alternatively be provided in an earphone to form a bone conduction earphone. The audio module 170 may parse out a voice signal from the vibration signal obtained by the bone conduction sensor 180M when the human voice vibrates the bone, to implement a voice function. The application processor may parse out heart rate information from the blood pressure pulse signal obtained by the bone conduction sensor 180M, to implement a heart rate detection function.

The button 190 includes a power on/off button, a volume button, and the like. The button 190 may be a mechanical button or a touch button. The electronic device 100 may receive a button-based input and generate a button signal input related to user setting or function control of the electronic device 100.

The motor 191 may generate a vibration alert. The motor 191 may be used for vibration alert for an incoming call, and may also be used for vibration feedback for a touch. For example, touch operations performed on different applications (for example, photographing and audio playing) may be corresponding to different vibration feedback effects. The motor 191 may also correspondingly provide different vibration feedback effects for touch operations performed on different areas of the display 194. Different application scenarios (for example, time reminder, message reception, alarm clock, and gaming) may also be corresponding to different vibration feedback effects. In addition, touch vibration feedback effects can be user-defined. In addition, touch vibration feedback effects can be user-defined.

The indicator 192 may be an indication lamp and may be configured to indicate a charging state, a power change, a message, a missed call, a notification, and the like.

The SIM card interface 195 is configured to connect a SIM card. The SIM card may be inserted into the SIM card interface 195 or pulled out from the SIM card interface 195, to come into contact with and separate from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into one SIM card interface 195 at the same time. The plurality of cards may be of a same type or of different types. The SIM card interface 195 may also be compatible with different types of SIM cards. The SIM card interface 195 may also be compatible with an external memory card. The electronic device 100 interacts with a network by using a SIM card, to implement functions such as calling and data communication. In some embodiments, the electronic device 100 uses an eSIM card, that is, an embedded SIM card. The eSIM card may be embedded into the electronic device 100, and cannot be separated from the electronic device 100.

Figure 6:
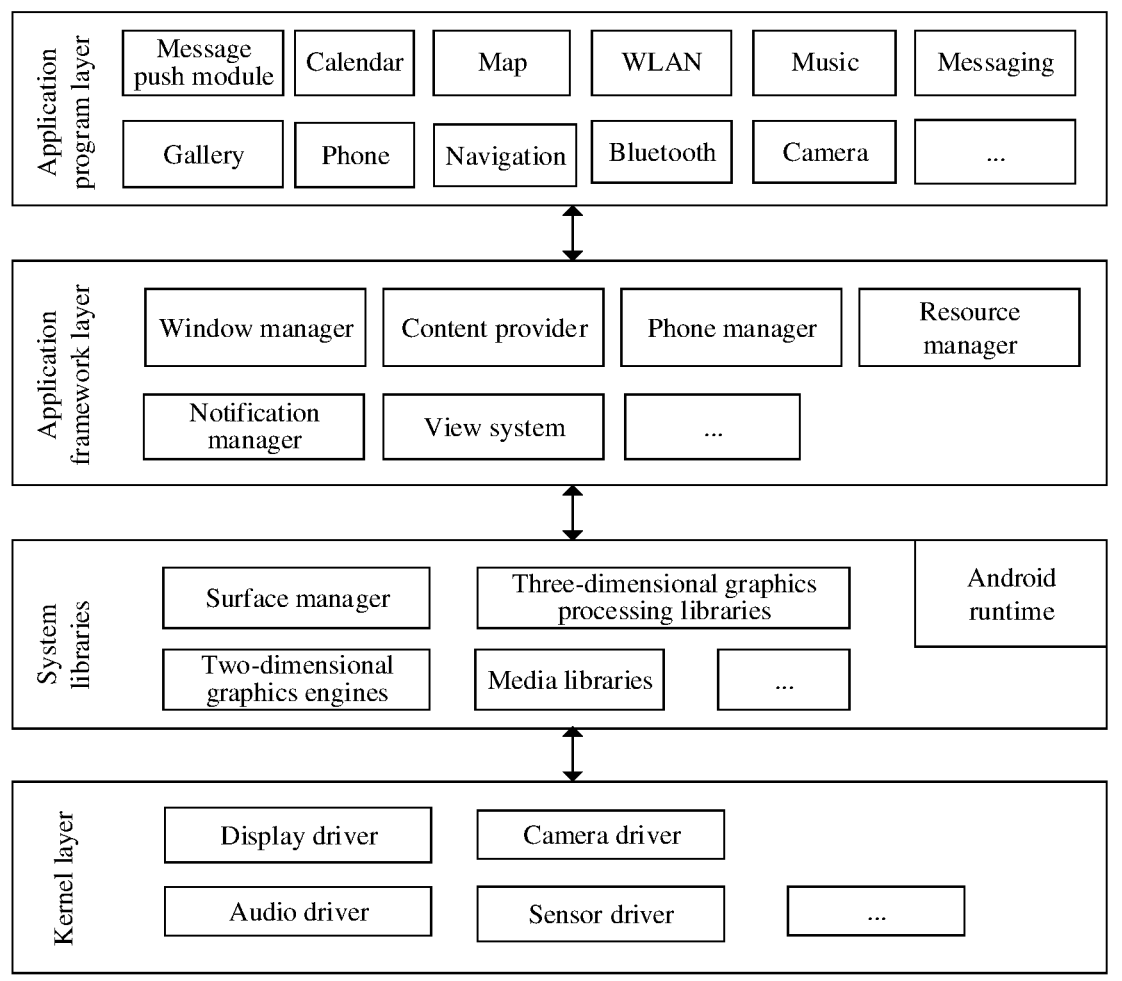
FIG. 6 is a block diagram of a software structure of an electronic device 100 according to an embodiment of this application.

FIG. 6 is a block diagram of a software structure of an electronic device 100 according to an embodiment of the present invention.

A layered architecture divides the software into layers, and each layer has a clear role and responsibility. The layers communicate with each other by using software interfaces. In some embodiments, an Android system is divided into four layers: an application program layer, an application program framework layer, an Android runtime (Android runtime) and a system library, and a kernel layer from top to bottom.

The application program layer may include a series of application packages.

As shown in FIG. 6, the application packages may include application programs (also referred to as application), such as message push module, gallery, calendar, phone, map, navigation, WLAN, Bluetooth, music, video, and messaging. The message push module is configured to implement the message push method provided in the embodiments of this application. For the related description of the message push module, refer to other embodiments of this application.

It can be understood that the electronic device in the embodiments of this application may include more or fewer application programs than shown in FIG. 6.

The application program framework layer provides application programming interfaces (application programming interface, API) and a programming framework for applications at the application layer. The application framework layer includes some predefined functions.

As shown in FIG. 6, the application framework layer may include a window manager, a content provider, a view system, a phone manager, a resource manager, a notification manager, a local profile assistant (Local Profile Assistant, LPA), and the like.

The window manager is used to manage window programs. The window manager can obtain a display size, and determine whether a status bar is present, lock a screen, take a screenshot, and the like.

The content provider is used to store and obtain data and allow the data to be accessed by applications. The data may include videos, images, audio, outgoing and received calls, a browsing history, bookmarks, a phone book, and the like.

The view system includes visual controls, for example, controls with text displayed and controls with pictures displayed. The view system may be used to build applications. A display screen may include one or more views. For example, a display screen including a messaging notification icon may include a text display view and a picture display view.

The phone manager is configured to provide a communication function of the electronic device 100, for example, management of a call status (including answering or disconnected).

The resource manager provides various resources for applications, for example, localized strings, icons, pictures, layout files, and video files.

The notification manager turns on an application to display notification information in a status bar, and may be configured to convey a notification-type message. The displayed information may automatically disappear after a short stay, without user intervention. For example, the notification manager is configured to notify a user of completion of downloading, provide a message notification, and the like. The notification manager may alternatively provide notifications, such as a notification of an application running in the background, appearing in a form of a chart or pull bar text in a top status bar of the system, or may provide a notification appearing in a form of a dialog on the screen. For example, notification may be implemented as follows: Text information is displayed in the status bar, an alert tone is played, the electronic device vibrates, or an indicator light blinks.

It can be understood that the message push module being included in the application program layer is only an example, and the message push module may alternatively be included in the application framework layer, which is not limited in the embodiments of this application.

The Android runtime (Android Runtime) includes core libraries and a virtual machine. The Android runtime is responsible for scheduling and managing an Android system.

The core libraries include functional functions that the java language needs to call and core libraries of Android.

The application layer and the application framework layer run on the virtual machine. The virtual machine executes java files of the application layer and the application framework layer as binary files. The virtual machine is used to perform functions such as object life cycle management, stack management, thread management, security and exception management, and garbage collection.

The system libraries may include a plurality of functional modules, for example, a surface manager (surface manager), media libraries (Media Libraries), three-dimensional graphics processing libraries (for example, OpenGL ES), and two-dimensional graphics engines (for example, SGL).

The surface manager is configured to manage a display subsystem, and provides blending of two-dimensional (2-Dimensional, 2D) and three-dimensional (3-Dimensional, 3D) layers for a plurality of applications.

The media library supports playback and recording in a plurality of common audio and video formats, still image files, and the like. The media libraries may support a plurality of audio and video encoding formats, for example, MPEG4, H.264, MP3, AAC, AMR, JPG, and PNG.

The three-dimensional graphics processing libraries are used to implement 3D graphics drawing, image rendering, synthesis, layer processing, and the like.

The 2D graphics engines are drawing engines for 2D drawing.

The kernel layer is a layer between hardware and software. The kernel layer includes at least a display driver, a camera driver, an audio driver, a sensor driver, and a virtual card driver.

The following exemplarily describes a working procedure of software and hardware of the electronic device 100 in combination with a capturing and photographing scenario.

When the touch sensor 180K receives a touch operation, a corresponding hardware interrupt is sent to the kernel layer. The kernel layer processes the touch operation into a raw input event (including information such as touch coordinates and a timestamp of the touch operation). The raw input event is stored at the kernel layer. The application program framework layer obtains the raw input event from the kernel layer, and identifies a control corresponding to the input event. For example, the touch operation is a touch tap operation, and a corresponding control of the tap operation is a control of a camera application icon. A camera application invokes an interface of the application framework layer to start the camera application, and then invokes the kernel layer to start a camera driver and capture static images or videos by using the camera 193.

In the foregoing embodiments, depending on the context, the term "when . . . " can be interpreted as "if . . . ", "after", "in response to determining of . . . ", or "in response to detection of . . . ". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line) or wireless (for example, through infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The storage medium includes any medium that can store program code, such as a ROM, a random access memory RAM, a magnetic disk, or an optical disc.

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
receiving, by a first terminal, a first notification message generated by a first application on the first terminal, and pushing the first notification message to a second terminal, when the first terminal and the second terminal have successfully established a communication connection, wherein the first terminal and the second terminal having successfully established the communication connection comprises: the first terminal and the second terminal having successfully established the communication connection directly via Bluetooth, universal serial bus (USB), wireless fidelity (Wi-Fi), or near field communication (NFC) technology;
receiving, by the first terminal, a second notification message generated by a second application on the first terminal, and storing the second notification message into a storage area on the first terminal, when the first terminal and the second terminal are communicatively disconnected, wherein the second notification message comprises a sending time of the second notification message at which the second notification message is sent by the second application; and
pushing, by the first terminal to the second terminal, the second notification message stored in the storage area, when the first terminal and the second terminal recover from being communicatively disconnected to having successfully re-established the communication connection, wherein the sending time of the second notification message is after the first terminal and the second terminal are communicatively disconnected and before the first terminal and the second terminal have successfully re-established the communication connection.

2. The method according to claim 1, wherein:
the first terminal and the second terminal having successfully established the communication connection comprises: the first terminal and the second terminal having successfully established the communication connection with a radio frequency resource for data interaction being established between the first terminal and the second terminal;
the first terminal and the second terminal being communicatively disconnected comprises: the first terminal and the second terminal having successfully established the communication connection with no radio frequency resource for data interaction being established between the first terminal and the second terminal; and
the first terminal and the second terminal recovering to having successfully re-established the communication connection comprises: the first terminal and the second terminal recovering from having no radio frequency resource for data interaction being established to having a radio frequency resource for data interaction established, and having successfully re-established the communication connection between the first terminal and the second terminal.

3. The method according to claim 2, wherein:

the radio frequency resource for data interaction being established between the first terminal and the second terminal comprises: a working mode of the second terminal being a first working mode, with a radio frequency resource for data interaction being established between the first terminal and the second terminal, and wherein the first working mode comprises a non-do-not-disturb mode or a non-driving mode; and no radio frequency resource for data interaction being established between the first terminal and the second terminal comprises: a working mode of the second terminal being a second working mode, with no radio frequency resource for data interaction being established between the first terminal and the second terminal, and wherein the second working mode comprises a do-not-disturb mode or a driving mode.

4. The method according to claim 1, wherein the first application and the second application are the same, and wherein receiving, by the first terminal, the first notification message, and pushing the first notification message to the second terminal, when the first terminal and the second terminal have successfully established the communication connection, comprises:

when the first terminal and the second terminal have successfully established the communication connection with a radio frequency resource for data interaction being established between the first terminal and the second terminal, and the first terminal runs a first configuration, receiving, by the first terminal, the first notification message generated by the first application, and sending the first notification message to the second terminal, wherein the first configuration indicates that the first terminal is allowed to send a notification message of the first application to the second terminal;

wherein receiving, by the first terminal, the second notification message, and storing the second notification message into the storage area, when the first terminal and the second terminal are communicatively disconnected, comprises:

when the first terminal and the second terminal have successfully established the communication connection with a radio frequency resource for data interaction being established between the first terminal and the second terminal, and the first terminal runs a second configuration, receiving, by the first terminal, the second notification message generated by the first application, and storing the second notification message into the storage area, wherein the second configuration indicates that the first terminal is not allowed to send a notification message of the first application to the second terminal; and wherein the first terminal and the second terminal recovering to having successfully re-established the communication connection comprises:

the first terminal recovering from running the second configuration to running the first configuration, with the communication connection being successfully re-established between the first terminal and the second terminal, and a radio frequency resource for data interaction being established between the first terminal and the second terminal.

5. The method according to claim 4, wherein:

the first terminal running the first configuration comprises: the first terminal running the first configuration when the first terminal determines that a working mode of the second terminal is a first working mode, wherein the first working mode comprises a non-do-not-disturb mode or a non-driving mode; and the first terminal running the second configuration comprises: the first terminal running the second configuration when the first terminal determines that a working mode of the second terminal is a second working mode, wherein the second working mode comprises a do-not-disturb mode or a driving mode.

6. The method according to claim 5, further comprising:

after the first terminal determines that the second terminal is in the second working mode, and the first terminal receives an operation instruction from a user indicating that sending a notification message of the first application to the second terminal is allowed, running the first configuration; or after the first terminal determines that the second terminal is in the second working mode, and receives an operation instruction from a user indicating that sending a notification message of the first application to the second terminal is not allowed, running the second configuration.

7. The method according to claim 1, wherein the storage area stores a sending time of a third notification message stored in the storage area, and the method further comprises:

when a time difference between the sending time of the third notification message and a current time is greater than a first preset duration, deleting the third notification message from the storage area.

8. The method according to claim 1, wherein the second notification message carries an application identifier of the second application that has sent the second notification message, and wherein storing the second notification message into the storage area comprises:

when the application identifier is comprised in application identifiers of target applications, storing the second notification message into the storage area, wherein each of the target applications comprises an application program whose notification messages are stored into the storage area by default, or each of the target applications comprises an application program whose notification messages are allowed to be stored into the storage area as defined by a user.

9. The method according to claim 1, wherein the second notification message carries an application identifier of the second application that has sent the second notification message, and the storage area stores a message count corresponding to the application identifier of the second application; and wherein after receiving, by the first terminal, the second notification message, the method further comprises:

incrementing a value of the message count by 1.

10. The method according to claim 1, wherein the second notification message carries an application identifier of the second application that has sent the second notification message, and wherein pushing, by the first terminal to the second terminal, the second notification message stored in the storage area comprises:

calculating a number of notification messages corresponding to the application identifier of the second application in application identifiers of notification messages in the storage area, to obtain a message count of the second application; and pushing the message count of the second application and the second notification message in the storage area to the second terminal.

11. The method according to claim 10, wherein:

the second notification message further comprises one or more types of the following data: an identifier of the second notification message, a notification title of the second notification message, a message content of the second notification message, or an application identifier and an application icon of the second application sending the second notification message.

12. The method according to claim 11, wherein before pushing, to the second terminal, the second notification message stored in the storage area, the method further comprises:

when it is determined that a third notification message in the storage area has been viewed, deleting the third notification message from the storage area.

13. The method according to claim 11, wherein the storage area is comprised in a random access storage area on the first terminal.

14. The method according to claim 11, wherein:

before receiving, by the first terminal, the second notification message, the method further comprises: creating the storage area on the first terminal; or after receiving, by the first terminal, the second notification message, and before storing the second notification message into the storage area, the method further comprises: creating the storage area on the first terminal.

15. The method according to claim 11, wherein after pushing, by the first terminal to the second terminal, the second notification message stored in the storage area, the method further comprises:

deleting the second notification message from the storage area; or deleting the storage area.

16. The method according to claim 11, wherein after pushing, by the first terminal to the second terminal, the second notification message stored in the storage area, the method further comprises:

skipping deleting the second notification message from the storage area; or when it is determined that a time difference between the sending time of the second notification message and a current time is greater than a second preset time period and the second notification message has not been viewed, displaying the second notification message in the storage area again on the first terminal, or pushing the second notification message in the storage area to the second terminal again, or displaying the second notification message in the storage area on the first terminal again and pushing the second notification message in the storage area to the second terminal again.

17. An electronic device, comprising:

one or more processors;

a non-transitory memory; and a display;

wherein the non-transitory memory is coupled to the one or more processors, the non-transitory memory is configured to store computer program code, the computer program code comprises a computer instruction, and when the one or more processors execute the computer instruction, the electronic device performs:

receiving a first notification message generated by a first application on a first terminal, and pushing the first notification message to a second terminal, when the electronic device and the second terminal have successfully established a communication connection, wherein the first terminal is the electronic device, and the electronic device and the second terminal having successfully established the communication connection comprises: the electronic device and the second terminal having successfully established the communication connection directly via Bluetooth, universal serial bus (USB), wireless communication technology (Wi-Fi), or near field communication (NFC) technology;

receiving a second notification message generated by a second application on the first terminal, and storing the second notification message into a storage area on the first terminal, when the electronic device and the second terminal are communicatively disconnected, wherein the second notification message comprises a sending time of the second notification message at which the second notification message is sent by the second application; and pushing, to the second terminal, the second notification message stored in the storage area, when the electronic device and the second terminal recover from being communicatively disconnected to having successfully re-established the communication connection, wherein the sending time of the second notification message is after the first terminal and the second terminal are communicatively disconnected and before the first terminal and the second terminal have successfully re-established the communication connection.

18. The electronic device according to claim 17, wherein receiving the first notification message, and pushing the first notification message to the second terminal, when the electronic device and the second terminal have successfully established the communication connection, comprises:

when the electronic device and the second terminal have successfully established the communication connection with a radio frequency resource for data interaction being established between the electronic device and the second terminal, and the electronic device runs a first configuration, receiving, by the electronic device, a second notification message generated by a first application, and sending the second notification message to the second terminal, wherein the first configuration indicates that the electronic device is allowed to send a notification message of the first application to the second terminal;

wherein receiving, by the electronic device, the second notification message, and storing the second notification message into the storage area, when the electronic device and the second terminal are communicatively disconnected, comprises:

when the electronic device and the second terminal have successfully established the communication connection with a radio frequency resource for data interaction being established between the electronic device and the second terminal, and the electronic device runs a second configuration, receiving, by the electronic device, a second notification message generated by the first application, and storing the second notification message into the storage area, wherein the second configuration indicates that the electronic device is not allowed to send a notification message of the first application to the second terminal; and wherein the electronic device and the second terminal recovering to having successfully re-established the communication connection comprises:

the electronic device recovering from running the second configuration to running the first configuration, with the communication connection being successfully re-established between the electronic device and the second terminal, and a radio frequency resource for data interaction being established between the electronic device and the second terminal.

19. The electronic device according to claim 18, wherein when the one or more processors execute the computer instruction, the electronic device further performs:

running the first configuration comprises: running the first configuration when the electronic device determines that a working mode of the second terminal is a first working mode, and wherein the first working mode comprises a non-do-not-disturb mode or a non-driving mode; and running the second configuration comprises: running the second configuration when the electronic device determines that a working mode of the second terminal is a second working mode, wherein the second working mode comprises a do-not-disturb mode or a driving mode.

20. A method, comprising:

when a first terminal and a second terminal have successfully established a communication connection with a radio frequency resource for data interaction being established between the first terminal and the second terminal, and the first terminal runs a first configuration, performing the following:

receiving, by the first terminal, a second notification message generated by a first application on the first terminal, and sending the second notification message to the second terminal; and receiving, by the first terminal, a third notification message generated by a second application, and sending the third notification message to the second terminal, wherein the first configuration indicates that the first terminal is allowed to send a notification message of the first application to the second terminal and allowed to send a notification message of the second application to the second terminal;

when the first terminal and the second terminal are communicatively disconnected, and the first terminal runs a second configuration, performing the following:

receiving, by the first terminal, a fourth notification message generated by the first application on the first terminal, and storing the fourth notification message into a storage area on the first terminal, wherein the fourth notification message comprises a sending time of the fourth notification message at which the fourth notification message is sent by the first application; and receiving, by the first terminal, a fifth notification message generated by a second application, and sending the fifth notification message to the second terminal, wherein the second configuration is used to indicate that the first terminal is not allowed to send a notification message of the first application to the second terminal; and when the first terminal and the second terminal have successfully re-established the communication connection, and the first terminal runs the second configuration, performing the following:

pushing, by the first terminal to the second terminal, the fourth notification message stored in the storage area, when the first terminal recovers from running the second configuration to running the first configuration, wherein the sending time of the fourth notification message is after the first terminal and the second terminal are communicatively disconnected and before the first terminal and the second terminal have successfully re-established the communication connection;

wherein the first terminal running the first configuration comprises: the first terminal running the first configuration when the first terminal determines that a working mode of the second terminal is a first working mode, wherein the first working mode comprises a non-do-not-disturb mode or a non-driving mode; and wherein the first terminal running the second configuration comprises: the first terminal running the second configuration when the first terminal determines that a working mode of the second terminal is a second working mode, wherein the second working mode comprises a do-not-disturb mode or a driving mode.

* * * * *